US012437454B2

(12) United States Patent
Shen et al.

(10) Patent No.: US 12,437,454 B2
(45) Date of Patent: Oct. 7, 2025

(54) IMAGE PROCESSING METHOD, ELECTRONIC DEVICE, AND STORAGE MEDIUM

(71) Applicant: Honor Device Co., Ltd., Shenzhen (CN)

(72) Inventors: Pingzhen Shen, Shenzhen (CN); Jinxiao Liu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/267,959

(22) PCT Filed: Dec. 19, 2022

(86) PCT No.: PCT/CN2022/140111
§ 371 (c)(1),
(2) Date: Jun. 16, 2023

(87) PCT Pub. No.: WO2023/160167
PCT Pub. Date: Aug. 31, 2023

(65) Prior Publication Data
US 2024/0394937 A1   Nov. 28, 2024

(30) Foreign Application Priority Data
Feb. 28, 2022   (CN) .......................... 202210193791.9

(51) Int. Cl.
*G06T 11/20*   (2006.01)
*G06T 5/70*   (2024.01)
(Continued)

(52) U.S. Cl.
CPC .............. *G06T 11/203* (2013.01); *G06T 5/70* (2024.01); *G06T 5/73* (2024.01); *G06T 15/04* (2013.01); *G06T 15/80* (2013.01)

(58) Field of Classification Search
None
See application file for complete search history.

(56) References Cited

U.S. PATENT DOCUMENTS

| 6,952,215 B1 | 10/2005 | Devins et al. |
| 2001/0026647 A1 | 10/2001 | Morita |

(Continued)

FOREIGN PATENT DOCUMENTS

| CN | 109218802 A | 1/2019 |
| CN | 110166792 A | 8/2019 |

(Continued)

OTHER PUBLICATIONS

Jiang et al., a machine-translated English version of a foreign patent application (WO 2021139630 A1) (Year: 2021).*

(Continued)

*Primary Examiner* — Kee M Tung
*Assistant Examiner* — Biao Chen
(74) *Attorney, Agent, or Firm* — Leydig, Voit & Mayer, Ltd.

(57) ABSTRACT

Embodiments of this application provide an image processing method, an electronic device, and a storage medium, which relates to the field of computer technologies. The method includes: receiving a first binding instruction delivered by an application program, where an operation type in the first binding instruction is not a read-only type, and a first framebuffer identifier in the first binding instruction indicates a first framebuffer used for on-screen rendering; receiving a first rendering instruction delivered by the application program, where the first rendering instruction indicates to draw first image content; and executing a second rendering instruction, to draw second image content on the first framebuffer, where the second rendering instruction indicates to draw the second image content, the second (Continued)

image content is generated based on the first image content, and a resolution of the second image content is higher than a resolution of the first image content.

20 Claims, 23 Drawing Sheets

(51) Int. Cl.
*G06T 5/73* (2024.01)
*G06T 15/04* (2011.01)
*G06T 15/80* (2011.01)

(56) References Cited

U.S. PATENT DOCUMENTS

| | | |
|---|---|---|
| 2007/0257940 A1 | 11/2007 | Ohta |
| 2013/0176322 A1 | 7/2013 | Bakalash et al. |
| 2017/0186136 A1 | 6/2017 | Khorasani |
| 2019/0073747 A1 | 3/2019 | Burch et al. |
| 2019/0287495 A1 | 9/2019 | Mathur et al. |
| 2021/0168441 A1 | 6/2021 | Lin et al. |
| 2021/0358192 A1 | 11/2021 | Zhang et al. |

FOREIGN PATENT DOCUMENTS

| | | | |
|---|---|---|---|
| CN | 110795054 A | 2/2020 | |
| CN | 109168068 B | 6/2020 | |
| CN | 111508055 A | 8/2020 | |
| CN | 113470153 A | 10/2021 | |
| CN | 113726950 A | 11/2021 | |
| CN | 113838180 A | 12/2021 | |
| CN | 114669047 A | 6/2022 | |
| WO | 2012173304 A1 | 12/2012 | |
| WO | WO-2021139630 A1 * | 7/2021 | ............... G06T 1/20 |

OTHER PUBLICATIONS

Xiong, a machine-translated English version of a foreign patent application (CN 113470153 A) (Year: 2021).*

* cited by examiner

IMAGE PROCESSING METHOD, ELECTRONIC DEVICE, AND STORAGE MEDIUM

CROSS-REFERENCE TO RELATED APPLICATIONS

This application is a national stage of International Application No. PCT/CN2022/140111, filed on Dec. 19, 2022, which claims priority to Chinese Patent Application No. 202210193791.9, filed on Feb. 28, 2022, both of which are hereby incorporated by reference in their entireties.

TECHNICAL FIELD

This application relates to the field of image processing technologies, and in particular, to an image processing method, an electronic device, and a storage medium.

BACKGROUND

With the development of screen technologies, a screen resolution of an electronic device, such as a mobile phone or a tablet, gets higher and higher, so that an image with a higher resolution can be displayed to provide better visual experience. In addition, before displaying an image, the electronic device needs to render the image. For the image with a higher resolution, higher overheads of computing power and power consumption are generated during rendering, which may further lead to a phenomenon of heating or stuttering of the electronic device, thereby affecting user experience.

In addition, in the prior art, some schemes in which a rendering load can be reduced are provided. However, the schemes for reducing the rendering load in the prior art generally come at the expense of image clarity, thereby resulting in a blurry image that is eventually displayed.

SUMMARY

Embodiments of this application provide an image processing method, an electronic device, and a storage medium, which can take account of image quality of an image while reducing a rendering load.

According to a first aspect, an embodiment of this application provides an image processing method. The method is applicable to an electronic device, and an application program runs on the electronic device. The method includes: receiving a first binding instruction delivered by the application program, where an operation type in the first binding instruction is not a read-only type, a first framebuffer identifier in the first binding instruction indicates a first framebuffer used for on-screen rendering, and receiving the first binding instruction represents that the on-screen rendering is about to be performed: receiving a first rendering instruction delivered by the application program, where the first rendering instruction indicates to draw first image content; and executing a second rendering instruction, to draw second image content on the first framebuffer, where the second rendering instruction indicates to draw the second image content, the second image content is generated based on the first image content, and a resolution of the second image content is higher than a resolution of the first image content.

In conclusion, by using the method according to this embodiment of this application, after determining that the on-screen rendering is about to be performed, when receiving the rendering instruction, the electronic device draws the second image content on the first framebuffer, instead of directly drawing the first image content indicated to be drawn by the rendering instruction on the first framebuffer of the on-screen rendering. The second image content is content obtained through improving the resolution of the first image content. In this way, the first image content may be drawn on the first framebuffer after the resolution of the first image content is improved, so that image quality of a displayed image may be improved.

In a possible design manner of the first aspect, the first image content is obtained through rendering in a second framebuffer, the second framebuffer is used for off-screen rendering, a first texture is bound to the second framebuffer, and a size of the first texture satisfies a preset condition. A size of a texture may represent a resolution of image content stored in the texture.

That is to say, by using the method in this application, for the first image content obtained through rendering in the second framebuffer, the electronic device may first improve the resolution of the first image content and then draw the first image content on the first framebuffer. A size of a texture attachment bound to the second framebuffer satisfies the preset condition. In this way, image content with a resolution that satisfies a specified condition may be drawn on the first framebuffer after the resolution of the image content is improved, thereby implementing improving the resolution in a targeted manner.

In another possible design manner of the first aspect, the size of the first texture includes a width of the first texture and a height of the first texture. That a size of the first texture satisfies a preset condition includes: the width of the first texture is greater than a first preset value and the height of the first texture is greater than the first preset value; and/or that a size of the first texture satisfies a preset condition includes: a difference between a ratio of the width of the first texture to the height of the first texture and a ratio of a width of a display screen of the electronic device to a height of the display screen is within a preset range.

That is to say, by using the method in this application, the electronic device may first improve a resolution of image content stored in a texture that has a larger size, and/or, that has an aspect ratio approximate to a screen aspect ratio, and then draw the image content on the first framebuffer. It should be understood that, the image content stored in the texture that has the larger size, and/or, that has the aspect ratio approximate to the screen aspect ratio is generally complex content (for example, a main gaming scene). These complex content generally determines image quality of an image, and overall image quality may be greatly improved through improving a resolution of the content and drawing the content on the first framebuffer.

In another possible design manner of the first aspect, the first image content is stored in the first texture, the second image content is stored in a second texture, the first rendering instruction includes a first texture identifier, and the first texture identifier indicates the first texture. The first texture identifier is carried in the first rendering instruction, which may indicate that to-be-drawn image content is image content stored in the first texture, namely, the first image content. Before the executing a second rendering instruction, the method further includes: changing the first texture identifier in the first rendering instruction to a second texture identifier, to obtain the second rendering instruction, where the second texture identifier indicates the second texture.

That is to say, by using the method in this application, the electronic device may change the to-be-drawn image content through changing a texture identifier carried in the first rendering instruction. After the first texture identifier is changed to the second texture identifier, it indicates that the to-be-drawn image content is image content stored in the second texture, for example, the second image content. In this way, the second image content with an improved resolution may be accurately indicated to be drawn on the first framebuffer.

In another possible design manner of the first aspect, the electronic device may further perform sharpening processing and/or noise reduction processing on the first image content during drawing the second image content on the first framebuffer, to further improve the image quality of the image. Specifically, the first rendering instruction further includes a first program identifier, the first program identifier indicates a first executable program program, the first program is used for drawing an image according to a first shader bound to the first program, a first model is not integrated in the first shader, and the first model is used for image sharpening processing and/or noise reduction processing: That is to say, the first program cannot be used for performing sharpening processing and/or noise reduction processing on an image. Correspondingly, based on the foregoing changing the first texture identifier in the first rendering instruction to the second texture identifier, the first program identifier in the first rendering instruction may be further changed to a second program identifier, to obtain the second rendering instruction. The second rendering identifier indicates a second program, the second program is used for drawing an image according to a second shader bound to the second program, and the first model is integrated in the second shader. That is to say, the second program can be used for performing sharpening processing and/or noise reduction processing on an image. The executing a second rendering instruction, to draw second image content on the first framebuffer includes: executing the second rendering instruction, to draw; on the first framebuffer, the second image content on which the sharpening processing is performed, and/or, to draw; on the first framebuffer, the second image content on which the noise reduction processing is performed.

That is to say, by using the method in this embodiment, based on improving the image quality through improving the resolution, the electronic device may further improve the image quality through sharpening processing and/or noise reduction processing, and further improve a rendering effect.

In another possible design manner of the first aspect, before the receiving a first binding instruction delivered by the application program, the method further includes: receiving a first create command delivered by the application program, where the first create command is used for creating a third framebuffer, the first create command includes a size of a third texture bound to the third framebuffer, and the size of the third texture satisfies the preset condition; and storing the size of the third texture. That a size of the first texture satisfies a preset condition includes: the size of the first texture is equal to the size of the third texture.

That is to say, by using the method in this embodiment, a size of a texture that satisfies the preset condition, namely, the size of the third texture, may be recorded before the on-screen rendering. Then, whether the size of the first texture satisfies the preset condition can be efficiently determined only through determining that the size of the first texture is equal to the size of the third texture.

In another possible design manner of the first aspect, before the receiving a first binding instruction delivered by the application program, the method further includes:

receiving a second binding instruction delivered by the application program, where the operation type in the second binding instruction is not the read-only type, and a second framebuffer identifier in the second binding instruction does not indicate the first framebuffer: storing the second framebuffer identifier; and then receiving a third binding instruction delivered by the application program, where the operation type in the third binding instruction is not the read-only type, and a third framebuffer identifier in the third binding instruction does not indicate the first framebuffer; and replacing the stored second framebuffer identifier with the third framebuffer identifier.

That is to say, by using the method in this embodiment, a framebuffer identifier of a framebuffer indicated to be bound may be stored each time after a binding instruction indicating to perform a drawing operation in a non-first framebuffer (namely, an off-screen framebuffer) is received. In this way, a framebuffer targeted by a recent drawing operation may always be recorded, to facilitate first improving a resolution of content obtained through rendering in the framebuffer subsequently, and then drawing the content on the first framebuffer.

Further, after the receiving a second binding instruction delivered by the application program, the method further includes: receiving a third rendering instruction delivered by the application program, where a rendering operation indicated to be performed in the third rendering instruction includes a drawing operation; and the storing the second framebuffer identifier includes: storing the second framebuffer identifier in response to receiving the third rendering instruction.

That is to say, by using the method in this embodiment, the electronic device further stores a framebuffer identifier, when according to a rendering instruction, it is determined that a to-be-performed rendering operation includes a drawing operation. In this way, the stored framebuffer identifier may be enabled to accurately indicate a recent framebuffer in which the drawing operation is performed.

In another possible design manner of the first aspect, because content with a high resolution is generally drawn on the off-screen framebuffer of the first framebuffer, after the receiving a first binding instruction delivered by the application program, the method further includes: determining whether a size of a to-be-processed texture bound to a to-be-processed framebuffer satisfies the preset condition, where the to-be-processed framebuffer is a framebuffer indicated by a stored framebuffer identifier. In this way, it is highly likely that the second framebuffer is determined through a determination about the preset condition performed for a framebuffer indicated by a recorded framebuffer identifier. If the condition is satisfied, the second framebuffer is the to-be-processed framebuffer, the first image content is obtained through rendering in the to-be-processed framebuffer, and the first texture is the to-be-processed texture. Correspondingly, the executing a second rendering instruction includes: executing the second rendering instruction if the size of the to-be-processed texture satisfies the preset condition. Therefore, image content obtained through rendering in the to-be-processed framebuffer is drawn on the first framebuffer after a resolution of the image content is improved.

In another possible design manner of the first aspect, before the executing a second rendering instruction, the method further includes: processing the first image content to generate the second image content.

That is to say, by using the method in this embodiment, the electronic device may improve the resolution of the first image content before executing the second rendering instruction, to make preparation for subsequently executing the second rendering instruction.

In another possible design manner of the first aspect, the processing the first image content includes: invoking a third program to process the first image content, where the third program is used for drawing an image according to a third shader bound to the third program, algorithmic source code of a second model is integrated in the third shader, and the second model is used for improving a resolution of the image.

That is to say, by using the method in this application, the electronic device may integrate a model used for improving an image resolution in a shader and then bind the shader in a program, thereby facilitating implementation of rendering.

In another possible design manner of the first aspect, a first marker is used to indicate that initialization of a model (for example, a first model or a second model) is completed. A binding instruction (namely, the first binding instruction) for the first framebuffer generally includes a drawing size, and the drawing size may limit a size of image content, where rendering of the image content is completed in the first framebuffer. After the receiving a first binding instruction delivered by the application program, the method further includes: obtaining a first marker, where the first marker indicates that initialization of a model is completed, and the model includes the second model; and storing the drawing size if the first marker is not obtained, and skipping storing the drawing size if the first marker is obtained.

That is to say, by using the method in this embodiment, the electronic device may store, when the model is not initialized, the drawing size carried in the first binding instruction, for subsequence model initialization.

In another possible design manner of the first aspect, before the invoking a third program to process the first image content, the method further includes: initializing the second model in the third program according to the size of the third texture and the drawing size. The initialized second model may implement that a resolution of image content having the size of the third texture is improved to the drawing size and is then output. After the second model in the third program is initialized, the third program is invoked to process the first image content.

In another possible design manner of the first aspect, after the initializing the second model in the third program, the method further includes: storing the first marker, that is, recording that model initialization is completed.

In another possible design manner of the first aspect, because processing, for example, improving a resolution, needs to be done between receiving the first binding instruction delivered by the application program and receiving the first rendering instruction delivered by the application program, to prevent the framebuffer bound in the middle from changing, after the first binding instruction delivered by the application program is received, a second marker may be stored, where the second marker indicates that the first framebuffer is currently bound. After the receiving a first rendering instruction delivered by the application program, the method further includes: obtaining the second marker. Correspondingly, the executing a second rendering instruction includes: executing the second rendering instruction if the second marker is obtained.

That is to say, by using the method in this embodiment, after the first rendering instruction delivered by the application program is received, only when a currently bound framebuffer is still the first framebuffer, the second rendering instruction is performed. In this way, a rendering mistake may be avoided.

In another possible design manner of the first aspect, after the storing a second marker, the method further includes: deleting the second marker after receiving a fourth binding instruction delivered by the application program, where a fourth framebuffer identifier in the fourth binding instruction does not indicate the first framebuffer. In this way, the second marker may be deleted in time when the currently bound framebuffer is not the first framebuffer.

In another possible design manner of the first aspect, there are a plurality of second models, the plurality of second models are integrated in a plurality of third shaders in one-to-one correspondence, and the plurality of shaders are one-to-one bound to a plurality of third programs. Before the invoking a third program to process the first image content, the method further includes: selecting a target model according to an enhancement level and/or an enhancement mode set by a user, where the target model is one of the plurality of second models. Correspondingly, the invoking a third program to process the first image content includes: invoking the third program in which the target model is located to process the first image content.

That is to say, by using the method in this embodiment, the electronic device may dynamically select a target model according to a user setting, to process a current frame, so that processing flexibility may be improved.

According to a second aspect, an embodiment of this application provides an electronic device. An application program runs on the electronic device, and the electronic device includes: a memory and one or more processors, where the memory is coupled to the processor; and the memory stores computer program code, the computer program code includes computer instructions, and when the computer instructions are executed by the processor, the electronic device is enabled to perform the method according to the first aspect and any possible design manner thereof.

According to a third aspect, an embodiment of this application provides a chip system, applicable to an electronic device including a display screen and a memory, where the chip system includes one or more interface circuits and one or more processors: the interface circuit and the processor are interconnected through a line: the interface circuit is configured to receive a signal from the memory of the electronic device, and send the signal to the processor, where the signal includes computer instructions stored in the memory; and when the processor executes the computer instructions, the electronic device is enabled to perform the method according to the first aspect and any possible design manner thereof.

According to a fourth aspect, an embodiment of this application provides a computer storage medium, including computer instructions, where when the computer instructions are run on an electronic device, the electronic device is enabled to perform the method according to the first aspect and any possible design manner thereof.

According to a fifth aspect, this application provides a computer program product, where when the computer program product runs on a computer, the computer is enabled to perform the method according to the first aspect and any possible implementation thereof.

It may be understood that, for beneficial effects that can be achieved by the electronic device according to the second aspect, the chip system according to the third aspect, the computer storage medium according to the fourth aspect, and the computer program product according to the fifth aspect provided above, reference may be made to beneficial effects in the first aspect and any possible design manner thereof. Details are not described herein again.

BRIEF DESCRIPTION OF DRAWINGS

FIG. 3A-1 to FIG. 3A-4 is a schematic flowchart of an image processing method according to an embodiment of this application;

FIG. 3C-1 to FIG. 3C-3 is a schematic flowchart of another image processing method according to an embodiment of this application;

FIG. 4A-1 and FIG. 4A-2 is a schematic flowchart of an image processing method according to an embodiment of this application;

FIG. 9A-1 to FIG. 9B-2 is a flowchart of another image processing method according to an embodiment of this application;

DESCRIPTION OF EMBODIMENTS

Figure 1:
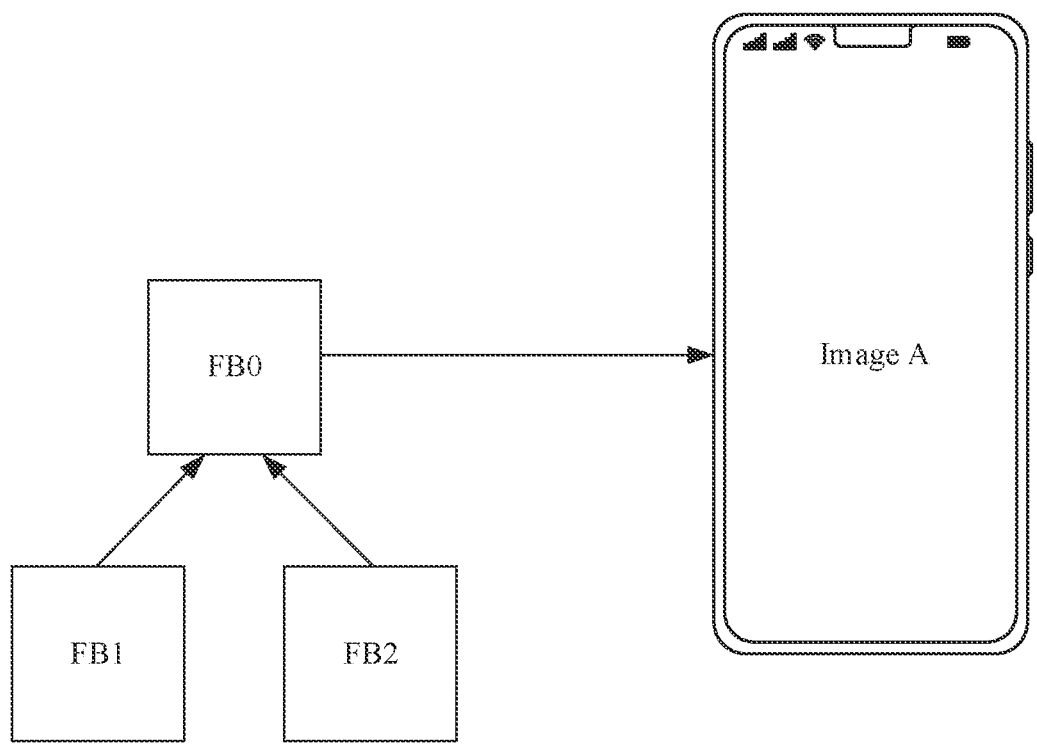
FIG. 1 is a schematic diagram of a principle of image display according to an embodiment of this application.

The terms "first" and "second" mentioned below are used merely for the purpose of description, and shall not be construed as indicating or implying relative importance or implying a quantity of indicated technical features. Therefore, a feature limited by "first" or "second" may explicitly or implicitly include one or more such features. In descriptions of the embodiments, unless otherwise stated, "a plurality of" means two or more.

In an application such as a gaming, modeling, or home designing application that requires a large amount of complex images and that is in an electronic device used by a user, the electronic device needs to complete a large amount of rendering processing to display the images.

In conventional technologies, when an application program (for example, the gaming application) needs to display an image, the application program can send render commands for the image to a central processing unit (CPU) of the electronic device. The CPU can control, according to these render commands, a graphics processing unit (GPU) of the electronic device to render the image, and rendered data may be stored in a provided framebuffer of the electronic device. The provided framebuffer may be storage space configured in an internal memory by the electronic device for an image that currently needs to be displayed, and may be created before image rendering. All content included in the provided framebuffer may be presented on a screen. That is to say, when needing to display an image, the electronic device may control, according to data that corresponds to the image and that is stored in the provided framebuffer, a display screen to display the image.

In some rendering scenarios, a frame of image includes many (or complex) graphic elements, or includes many (or complex) image effects (for example, shadows). As a result, a plurality of steps are generally required to complete rendering. In this way, if the rendering is all completed in the provided framebuffer, the image may not be fully displayed because the plurality of rendering steps are completed in sequence in the provided framebuffer. Therefore, in the foregoing rendering scenarios, a plurality of off-screen framebuffers are required to be created to complete the rendering. After the electronic device creates the plurality of off-screen framebuffers, the plurality of rendering steps may be separated and completed in the plurality of off-screen framebuffers by the electronic device, and then rendering results in the plurality of off-screen framebuffers may be drawn (pasted) on the provided framebuffer by the electronic device. Similar to a function of the provided framebuffer, a function of the plurality of off-screen framebuffers is for image rendering. A difference is that content in the plurality of off-screen framebuffers is not directly presented on a screen to implement off-screen rendering, while content in the provided framebuffer is directly presented on the screen to implement on-screen rendering. The on-screen rendering, also referred to as current-screen rendering, means that a rendering operation is performed in a screen buffer region (namely, the provided framebuffer) currently used for display. The off-screen rendering means that the rendering operation is performed in a buffer region (namely, the off-screen framebuffer) established outside the screen buffer region (namely, the provided framebuffer) currently used for display.

Refer to FIG. 1. An example in which an electronic device is a mobile phone is used. An image A includes complex graphic elements and effects. Before rendering the image A, two off-screen framebuffers (an FB1 and an FB2) may be created. When performing rendering on the image A, some rendering steps may be completed in the FB1, to implement rendering of a part of geometric graphics and/or effects of the image A. and some other rendering steps may be completed in the FB2, to implement another part of the geometric graphics and/or effects of the image A. Rendering results in the FB1 and FB2 are then drawn on a provided framebuffer (an FB0). The rendering results in the FB1 and FB2 are not directly presented on a screen, to implement off-screen rendering. Finally, content in the FB0 is directly presented on the screen, to implement on-screen rendering.

For some rendering scenarios with a high load, for example, rendering scenarios of a high resolution game, to reduce a rendering load, a lower resolution is used in the off-screen framebuffers to implement the off-screen rendering. In addition, because a line of an element in a user interface (UI), for example, an operation control (stick control) in a gaming interface, is thin, if the off-screen rendering of the UI is implemented in the off-screen framebuffers with the lower resolution, and the UI is then drawn on the provided framebuffer, as a result, an effect of a UI finally presented on the screen is poor. For example, the line is not clear. Therefore, to improve a rendering effect, the UI is generally drawn on the provided framebuffer. In this way, after drawing the rendering results of the off-screen framebuffers on the provided framebuffer, a complete interface image may be formed by the rendering results that are in the off-screen framebuffers and are drawn on the provided framebuffer and the UI drawn on the provided framebuffer. In this way, although the rendering load can be reduced while improving the rendering effect, because the lower resolution is used in the off-screen rendering, in terms of image quality, an image displayed by the electronic device is relatively blurred.

With reference to FIG. 1, a rendering scenario of a high resolution game is used as an example. First it should be noted that, during game rendering, power consumption of rendering a main gaming scene is the highest. The main gaming scene is a gaming image subject, generally including content such as a character, a building, and a mountain, and an effect (for example, a light effect added for the building) added for the content. Therefore, in the FB1 and FB2 with the lower resolution, completing rendering of content such as the main gaming scene, and an overall effect (for example, a shadow effect, a bloom effect, or a dark effect) may greatly reduce the rendering load. However, because the main gaming scene is the gaming image subject, which determines gaming image quality, using the lower resolution in the off-screen framebuffers to render the main gaming scene affects the gaming image quality that is finally displayed.

Figure 2:
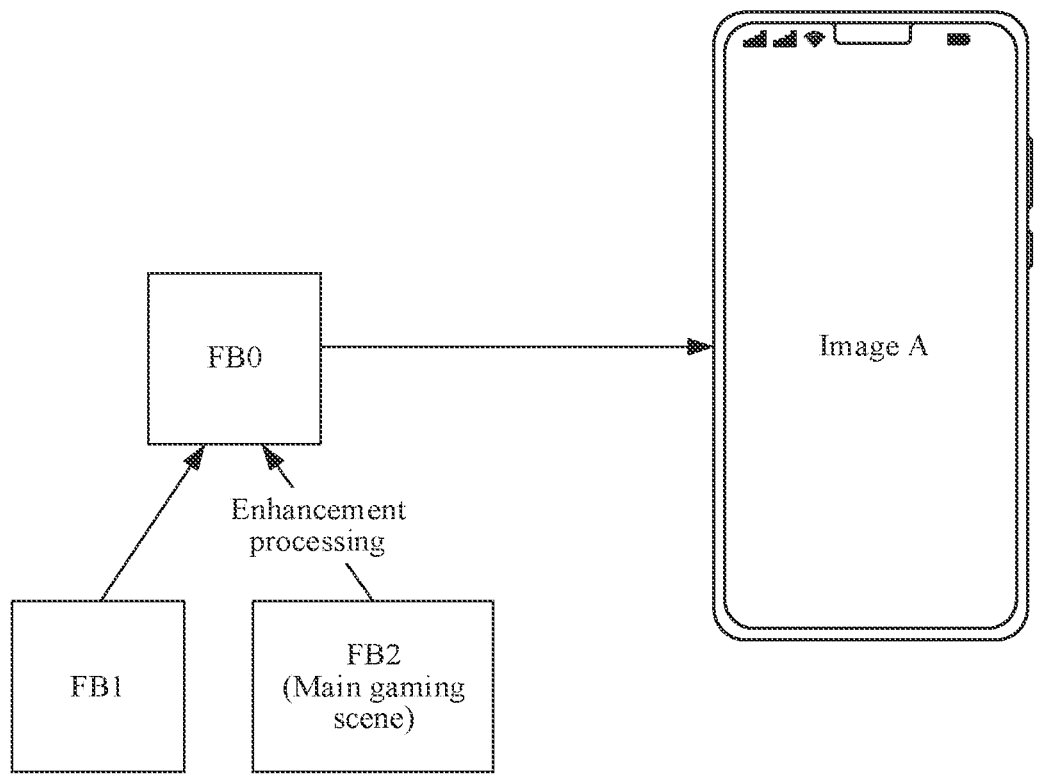
FIG. 2 is a schematic diagram of a principle of another image display according to an embodiment of this application.

Based on the foregoing problems, refer to FIG. 2. This application provides an image processing method. The method is applicable to an electronic device, such as a mobile phone or a tablet, that has a requirement of image rendering. Specifically, before rendering results in off-screen framebuffers are drawn on a provided framebuffer, a target framebuffer (for example, an FB2) in which preset content is drawn is determined in the off-screen framebuffers. The preset content refers to content that requires high power consumption in image rendering and determines image quality, for example, a main gaming scene. Image quality enhancement processing, for example, resolution improvement, is performed on a rendering result in the target framebuffer. In this way, the preset content is also enhanced. Then, when the rendering results in the off-screen framebuffers are drawn on the provided framebuffer, for the target framebuffer, an enhanced result is drawn on the provided framebuffer. Finally, a complete interface image is formed by the rendering results that are in the off-screen framebuffers and are drawn on the provided framebuffer and a UI drawn on the provided framebuffer.

By using the method in this embodiment of this application, the electronic device uses a lower resolution in the off-screen framebuffers to complete rendering of the preset content, so that rendering load can be reduced. In addition, the electronic device draws, after performing image quality enhancement processing on the preset content obtained through rendering in the off-screen framebuffers, the preset content on the provided framebuffer. Then, the preset content with improved image quality is finally displayed in a display screen of the electronic device. In this way, the electronic device can ensure image clarity while reducing the rendering load.

The image processing method provided in this embodiment of this application is applicable to the electronic device, such as a mobile phone, a tablet computer, a Bluetooth keyboard, a mobile phone, a tablet computer, a desktop computer, a laptop computer, a handheld computer, a notebook computer, an ultra-mobile personal computer (UMPC), a netbook, a cellular phone, a personal digital assistant (PDA), an artificial intelligence (AI) device, a wearable device, an in-vehicle device, a smart home device, and/or a smart city device. A specific form of the device is not specially limited in this embodiment of this application.

For ease of description, in the following embodiments, a scheme of this application is described by using a gaming application in the electronic device as an example. It should be understood that, when an application program is an application that requires a large amount of complex images, for example, a modeling application, an implementation principle of the application is similar to that of the gaming application. The implementation principles are not listed one by one in this specification.

Exemplarily, in the gaming application, the preset content is the main gaming scene. In addition, the gaming application may use an OpenGL graphics library to complete rendering-related processing. In another rendering engine/rendering environment that is different from the OpenGL, for example, a Vulkan graphics library, an implementation mechanism is similar, and only a corresponding function may be different.

When a game starts to run (load), the gaming application enters a resource allocation stage, the gaming application delivers a framebuffer resource create command to a CPU, and the CPU controls a GPU to create a framebuffer (an FB) corresponding to an image, to make preparation for subsequent image rendering. It should be noted herein that, the provided framebuffer and the off-screen framebuffers may be collectively referred to as the FB. In the following, where the FB directly occurs, and where the off-screen framebuffers and the provided framebuffer are not distinguished, it may be understood as that the provided framebuffer and the off-screen framebuffers are included.

After the resource allocation stage ends, when the gaming application needs to render an image, the gaming application may deliver a render command to the CPU. In the render command, an FB that needs to be invoked for rendering the image, and a rendering operation that needs to be performed in the FB may be indicated.

In this embodiment of this application, the CPU intercepts the render command delivered by the gaming application, and determines the FB that needs to be invoked. When the CPU determines that the provided framebuffer (for example, an FB0) needs to be invoked, it represents that corresponding rendering steps, for example, drawing the rendering results that are in the off-screen framebuffers on the provided framebuffer (for example, the FB0), and drawing the UI on the provided framebuffer (for example, the FB0), are about to start to be completed in the provided framebuffer (for example, the FB0). In this case, in the off-screen framebuffers, the CPU may determine the target framebuffer on which the preset content is drawn. Then, the CPU sends to the GPU a command for performing image quality enhancement processing on the rendering result in the target framebuffer. The GPU performs the image quality enhancement processing on the rendering result in the target framebuffer according to the image quality enhance command, to improve image quality of the main gaming scene. The CPU changes the render command according to a result obtained through the image quality enhancement processing performed by the GPU, and sends a changed render command to the GPU. The GPU executes the changed render command, and then an enhanced main gaming scene may be drawn on the provided framebuffer (for example, the FB0).

It is to be noted that, in this embodiment of this application, the foregoing GPU may also be replaced with a neural-network processing unit (NPU) to complete corresponding processing. A processing principle and a specific implementation are similar to those of the GPU, and details are not described in this specification again.

It is to be noted herein that, in game rendering, a rendering result of a former rendering step may need to be superimposed on a latter rendering step. In addition, before drawing the UI, rendering of content other than the UI in the image should have already been completed in the off-screen framebuffers. Therefore, during rendering each frame of image, generally the main gaming scene should be drawn on an off-screen framebuffer targeted by a last drawing operation (the main gaming scene must experience the drawing operation to complete the rendering) before UI drawing. However, after the drawing of the main gaming scene is completed in the off-screen framebuffers, overall effects such as bloom and a shadow may be further superimposed. These overall effects also need to be completed through the drawing operation, and are drawn on the off-screen framebuffer drawn with the main gaming scene. That is, under the foregoing special situation, it may be the overall effects such as the bloom and the shadow that are drawn on the off-screen framebuffer targeted by the last drawing operation before the UI drawing. Based on this, when the target framebuffer (for example, the FB2) on which the preset content is drawn is determined in the off-screen framebuffers, it only needs to determine whether the off-screen framebuffer targeted by the last rendering operation before the UI drawing is the target framebuffer (for example, the FB2) on which the preset content is drawn, and then basically, the target framebuffer may be accurately determined.

It should be understood that, actual implementation is not limited to the foregoing manner for determining the target framebuffer. Exemplarily, alternatively, whether the off-screen framebuffer is the target framebuffer may be determined when rendering is performed on each off-screen framebuffer.

In the following embodiments, schemes provided in the embodiments of this application are described in detail with reference to the accompanying drawings mainly by using a manner of determining whether the off-screen framebuffer targeted by the last drawing operation before the UI drawing is the target framebuffer (namely, the FB on which the main gaming scene is drawn) as an example.

Exemplarily, FIG. 3A-1 to FIG. 3A-4 is a schematic flowchart of an image processing method according to an embodiment of this application. The method is applied to an electronic device, and the electronic device may include an application program, a CPU, a GPU, and an internal memory (referred to as a memory below). In FIG. 3A-1 to FIG. 3A-4, a scheme of this application is described by using an example in which rendering of a main gaming scene is completed in an FB2, and an FB0 is a provided framebuffer. That is, the FB0 is used for on-screen rendering, and an FB1 and the FB2 are used for off-screen rendering. In addition, for ease of description, the FB0 may be referred to as a first framebuffer, and a target framebuffer (for example, the FB1 or the FB2) on which the main gaming scene is drawn may be referred to as a second framebuffer.

In a resource allocation stage, a gaming application delivers a framebuffer resource create command to the CPU. The framebuffer resource create command is used for creating an FB corresponding to an image, and make preparation for subsequent image rendering.

In the framebuffer resource create command, a glGenFrameBuffer function may be invoked to indicate to create an FB, and assign a framebuffer identifier, for example, an ID value, to the created FB. In addition, a texture needs to be bound to each FB as a writing carrier for a rendering instruction. For example, information such as a color, a depth, or a stencil is written in the texture. A glGenTextures function may be invoked to indicate to create a texture, and assign a texture identifier, for example, a texture ID, to the created texture. A glTexImage2D function may be invoked to configure a width and a height for the created texture, and width*height is a size of the texture. A glFramebufferTexture2D function may be invoked to bind the created texture to the FB. After the texture is bound to the FB, the texture may be referred to as a texture attachment. In this embodiment, the CPU intercepts the framebuffer resource create command delivered by the gaming application.

301: The CPU determines, in response to receiving an FB2 resource create command delivered by the gaming application, a size of a texture attachment 1 indicated to be bound in the FB2 resource create command.

The FB2 resource create command may be referred to as a first create command, an FB that the first create command indicates to create is referred to as a third FB, and a texture bound to the third FB is referred to as a third texture.

In this embodiment, in a case that the framebuffer resource create command is intercepted, the CPU may determine, through recognizing a width value and a height value that are carried by the glTexImage2D function in the framebuffer resource create command, that a size of a texture attachment bound to a currently created framebuffer is width*height. The size of the texture attachment may also be understood as a resolution of the currently created framebuffer.

The following FB2 resource create command is used as an example:

unsigned int FB2; // a framebuffer object is defined, and a variable name is defined as an FB2;

glGenFramebuffers (1, &FB2); // a framebuffer FB2 is created:

glBindFramebuffer (GL_FRAMEBUFFER,FB2); // the FB2 is bound, where GL_FRAMEBUFFER is used for indicating an FB2 type as a readable-and-writable type:

unsigned int textureColor; // a texture is defined, and a variable name is defined as textureColor:

glGenTextures (1, &textureColor1); // a texture textureColor1 is created:

glBindTexture (GL_TEXTURE_2D, textureColor1); // the texture textureColor1 is bound, where GL_TEXTURE_2D is used for indicating a texture type as a 2D texture:

glTexImage2D (GL_TEXTURE_2D, 0, GL_RGB, 1280, 626, 0, GL_RGB, GL_UNSIGNED_BYTE, NULL); // a memory space with a size of 1280*626 is allocated to the texture textureColor1, that is, a size of the textureColor1 is 1280*626, where a second parameter (namely, 0) in the function may be used for indicating a texture level, a third factor (namely, GL_RGB) in the function may be used for indicating a target texture format, a seventh factor (namely, GL_RGB) in the function may be used for indicating an input parameter texture format, an eighth factor (namely, GL_UN- SIGNED_BYTE) in the function may be used for indicating an input parameter texture data type; and glFramebufferTexture2D (GL_FRAMEBUFFER, GL_COLOR_ATTACHMENT0, GL_TEXTURE_2D, textureColor1, 0); // the texture textureColor1 is bound to the framebuffer FB2.

In the foregoing example of the FB2 resource create command, the texture attachment 1 bound to the FB2 is the textureColor1. The glTexImage2D function includes a width, for example, 1280, and a height, for example, 626. The size of the texture attachment 1 is a size indicated by width*height, for example, 1280*626.

For ease of description, a texture bound to the target framebuffer may be referred to as a first texture, and a size of the first texture also includes a width of the first texture and a height of the first texture. In addition, a rendering result obtained through rendering in the target framebuffer is stored in the first texture.

302: The CPU determines that the size of the texture attachment 1 satisfies a preset condition.

The preset condition is a condition for determining a resolution of an FB used in drawing the main gaming scene. If a size of a texture attachment satisfies the preset condition, it represents that the size of the texture attachment is the resolution of the FB used in drawing the main gaming scene. If a size of a texture attachment does not satisfy the preset condition, it represents that the size of the texture attachment is not the resolution of the FB used in drawing the main gaming scene.

The larger the size of the texture attachment is, the higher the resolution of the FB is, and then content with a higher resolution may be drawn on the FB. Generally, image quality of the main gaming scene determines image quality of the game. Therefore, the resolution of the FB used in rendering the main gaming scene should be a highest resolution during off-screen rendering. Based on this, the preset condition may be set to include: In the size of the texture attachment, a width value exceeds a first preset value, and a height value exceeds a second preset value.

In some embodiments, for each game, resolutions of main gaming scenes may be obtained by means of frame capture when the game runs in different machine models. Then, the first preset value and the second preset value are set according to the obtained resolutions of the main gaming scenes. In this way, the preset condition may be set to be applicable to various machine models.

Exemplarily, for a game a in a machine model 1, a resolution of a main gaming scene is 1280*840, while for the game a in a machine model 2, a resolution of a main gaming scene is 1320*960. Then, the first preset value may be set to 1250 (less than width values of the resolutions of the main gaming scenes in different machine models), and the second preset value may be set to 800 (which is less than height values of the resolutions of the main gaming scenes in different machine models).

Further, if the first preset value and the second preset value are set too low, a determination result is inaccurate. For example, an FB used in drawing a bloom effect instead of a main gaming scene is determined as an FB used in drawing the main gaming scene. Therefore, to improve accuracy of the determination result, the first preset value and the second preset value may be set according to resolutions of main gaming scenes corresponding to different image quality levels when the game runs in different machine models.

Exemplarily, when the game a runs in the machine model 1, the resolution of the main gaming scene at default image quality (which may be recorded as first-level image quality) is 1280*840, and the resolution of the main gaming scene at a secondary level of the default image quality (which may be recorded as second-level image quality) is 1080*820. When the game a runs in the machine model 2, the resolution of the main gaming scene at the first-level image quality is 1320*960, and the resolution of the main gaming scene at the second-level image quality is 1080*640. In this case, the first preset value may be set to 1250 (which is less than width values of the resolutions of the main gaming scenes at the first-level image quality in different machine models, and greater than width values of the resolutions of the main gaming scenes at the second-level image quality in different machine models), and the second preset value may be set to 850 (which is less than height values of the resolutions of the main gaming scenes at the first-level image quality in different machine models, and greater than height values of the resolutions of the main gaming scenes at the second-level image quality in different machine models).

In addition, the main gaming scene is a main body of a gaming image, and the size of the main gaming scene should be approximate to a size of the gaming image. Therefore, a resolution aspect ratio of the FB used in rendering the main gaming scene should be approximately equal to a screen aspect ratio of the electronic device. Based on this, the preset condition may be set to include: A difference between a ratio of the width value to the height value in the size of the texture attachment and the screen aspect ratio (namely, a ratio of a width value to a height value) is within a preset range.

By using an example in which the first preset value in the preset condition is 1200, the second preset value in the preset condition is 600, the preset range is −0.1 to 0.1, and the screen aspect ratio is 16:9, assuming that the size of the texture attachment carried by the glTexImage2D function in an FB1 resource create command is 1000*500, the foregoing preset condition is not satisfied. Assuming that for the texture attachment carried by the glTexImage2D function in the FB2 resource create command, a width is 1280 and a height is 626, the foregoing preset condition is satisfied.

In this embodiment, an example in which the main gaming scene is drawn on the FB2 is used for description. Then, naturally, it may be determined that the size of the texture attachment 1 bound to the FB2 satisfies the preset condition.

After it is determined that the preset condition is satisfied, the resolution (for example, 303) of the main gaming scene may be stored. After it is determined that the preset condition is not satisfied, the resolution of the main gaming scene may be skipped to be stored.

303: The CPU stores the size of texture attachment 1, exemplarily stored as a resolution 1.

If the size of the texture attachment satisfies the preset condition, a size of a texture attachment corresponding to the currently created FB is the resolution of the main gaming scene. Storing the size of the texture attachment in the memory is equivalent to storing the resolution of the main gaming scene. In this embodiment, if the size of the texture attachment 1 bound to the FB2 satisfies the preset condition, storing the size of the texture attachment 1 in the memory is equivalent to recording the resolution of the main gaming scene as the size of the texture attachment 1. That is to say, the resolution 1 is the resolution of the main gaming scene. During subsequent rendering, the resolution 1 may be used to recognize rendering of the main gaming scene.

It should be noticed that, for any FB that may be used for drawing the main gaming scene, a size of a texture attachment bound to the FB should be the resolution I stored in the memory. Therefore, recording the resolution I may be used for accurately recognizing the rendering of the main gaming scene subsequently.

304: The CPU sends the FB2 resource create command to the GPU.

After receiving the framebuffer resource create command, the CPU sends the framebuffer resource create command to the GPU. According to the framebuffer resource create command, the GPU may create a corresponding FB and allocate an identifier (for example, an ID of the FB) to the created FB. In addition, the GPU may create a texture attachment bound to the FB, and allocate a size and an identifier (for example, an ID of the texture) to the texture attachment. After completing creation of the FB and the texture attachment bound to the FB, the GPU further stores the identifier of the created FB, and a correspondence between the identifier of the texture attachment and the size of the texture attachment, for subsequently searching the size and identifier of the corresponding texture attachment according to the identifier (for example, a drawing ID) of the FB.

Figures 1, 3A:
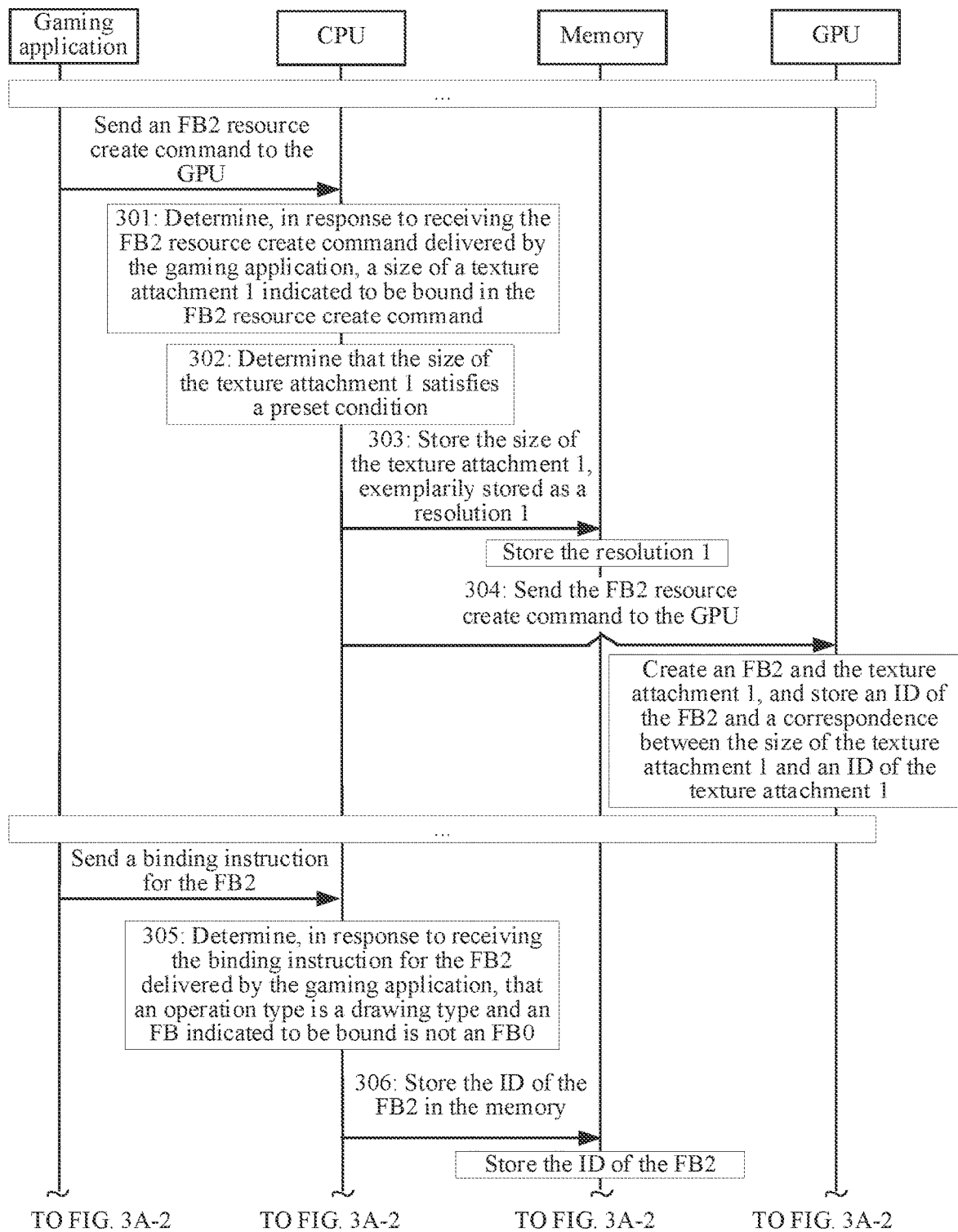
Figures 2, 3A:
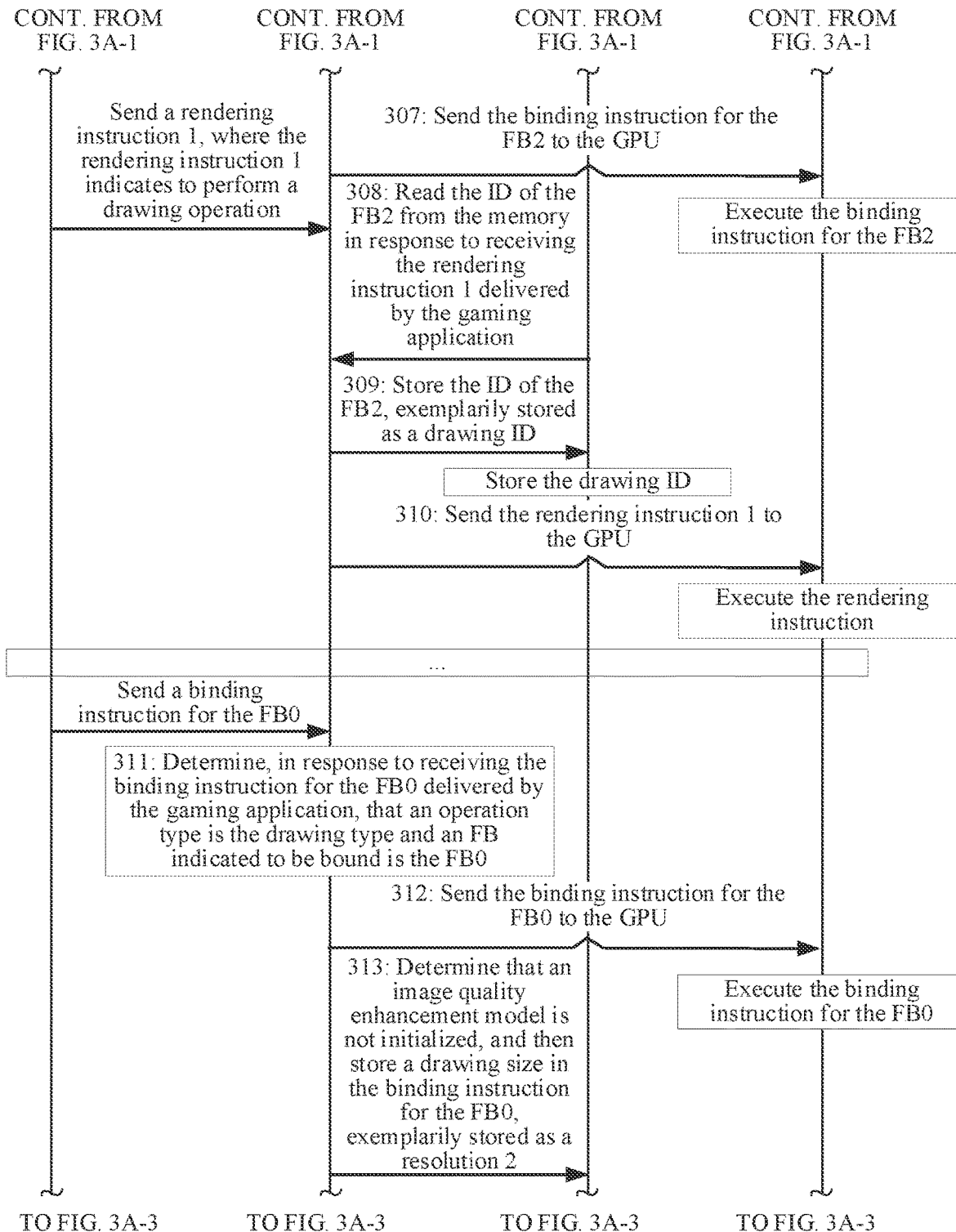

A performing timing of the foregoing 304 is not limited to what shown in FIG. 3A-1, and during actual implementation, 304 may be performed between 301 to 303, or may be performed before 301.

It should be understood that, in the resource allocation stage, the gaming application delivers, according to a rendering requirement, a plurality of framebuffer resource create commands to the CPU. For example, an FB1 resource create command, an FB2 resource create command, an FB3 resource create command, and . . . are delivered in sequence. In the foregoing 301 to 304, a specific implementation of storing the resolution of the main gaming scene by the FB2 is described by using the FB2 resource create command as an example. During actual implementation, in the resource allocation stage, starting from that the gaming application delivers a first framebuffer resource create command, the CPU performs steps similar to the foregoing 301 and subsequent steps (where only the FB2 therein needs to be replaced) until it is determined that the preset condition is satisfied, then for subsequent delivering each framebuffer resource create command by the gaming application, the foregoing steps (where only the FB2 therein needs to be replaced) 301 to 303 are no longer performed, but the framebuffer resource create command needs to be sent to the GPU to create the corresponding FB and store the correspondence.

After the resource allocation stage ends, when the gaming application needs to display an $N^{th}$ frame (for example, a first frame) of image, the gaming application delivers a render command to the CPU, to complete rendering in the corresponding FB. Exemplarily, for the rendering of the $N^{th}$ frame of image, the gaming application delivers a plurality of render commands in sequence as follows: delivering a render command for the FB1, to complete rendering a part of content of the $N^{th}$ frame of image on the FB1: delivering a render command for the FB2, to complete rendering another part of the content (as the main gaming scene in this embodiment) of the $N^{th}$ frame of image on the FB2; and additionally, delivering a render command for the FB0, and completing UI drawing on the FB0.

Further, in the render command for each FB, the following two part of instructions are included: a binding instruction and a rendering instruction for the FB. The gaming application first delivers the binding instruction for the FB, to bind the corresponding FB, and then delivers the rendering instruction, to complete a rendering operation on the currently bound FB.

The gaming application may invoke a glBindFrameBuffer function to deliver the binding instruction for the FB. The glBindFrameBuffer function carries two parameters including a type (target) and an ID. The type is used for indicating an operation type of the rendering operation, and the operation type may be a read-only type (GL_READ_FRAME-BUFFER), a write-only type (GL_DRAW_FRAMEBUF-FER), or a readable-and-writable type (GL_FRAMEBUFFER). Both the write-only type and the readable-and-writable type are writable. During rendering, writing means drawing. Therefore, both the write-only type (GL_DRAW_FRAMEBUFFER) and the readable-and-writable type (GL_FRAMEBUFFER) may be referred to as a drawing type. The ID is used for indicating an ID of an FB that needs to be bound.

According to an aspect, because image quality enhancement needs to be performed on the main gaming scene obtained through rendering in the off-screen framebuffers before the UI drawing, after rendering of a frame of image starts, a drawing ID (an ID of the off-screen framebuffer targeted by a last drawing operation) may be recorded, to facilitate determining whether the off-screen framebuffer targeted by the last drawing operation before the UI drawing is the target framebuffer (namely, the FB drawn with the main gaming scene, or the FB2 in this embodiment). Specific implementation of recording the drawing ID is as shown in the following 305 to 310:

305: The CPU determines, in response to receiving a binding instruction for the FB2 delivered by the gaming application, that an operation type is the drawing type and an FB indicated to be bound is not the FB0.

The binding instruction for the FB2 may also be referred to as a second binding instruction, and a framebuffer identifier carried in the second binding instruction is recorded as a second framebuffer identifier.

Because completion of the rendering of the main gaming scene also requires the drawing operation, during rendering the main gaming scene, the operation type indicated in the binding instruction for the FB should be the drawing type. Based on this, after the gaming application delivers a binding instruction for any FB, the CPU intercepts the binding instruction and determines whether an operation type is the drawing type according to the binding instruction. If the operation type is GL_DRAW_FRAMEBUFFER or GL_FRAMEBUFFER, the operation type is the drawing type. In this embodiment, the main gaming scene is drawn on the FB2, so that the operation type carried in the binding instruction for the FB2 naturally is the drawing type. Conversely, if the operation type is GL_READ_FRAMEBUF-FER, the operation type is not the drawing type.

An example in which the glBindFramebuffer function in the binding instruction for the FB2 is glBindFramebuffer (GL_FRAMEBUFFER,FB2) is used, where the operation type is GL_FRAMEBUFFER, namely, the readable-and-writable type, belonging to the drawing type. Then, it may be determined that the operation type is the drawing type.

It is to be noted that, when the FB indicated to be bound is the FB0, it represents that the UI drawing is about to start. In this case, some steps, for example, recording the resolution of the UI for initializing an image quality enhancement model, and determining whether a requirement for performing image quality enhancement processing exists, that are strongly related to the image quality enhancement processing need to be performed. When the FB indicated to be bound is an off-screen framebuffer, such as the FB1 or the FB2, there is no need to perform these steps. It can be seen that, when the FB indicated to be bound is the FB0 and when the FB indicated to be bound is not the FB0, operations that need to be performed are different. Based on this, after the binding instruction is intercepted, whether the FB indicated to be bound is the FB0 also needs to be determined. The binding instruction for the FB2 is currently intercepted, that is, the FB2, instead of the FB0, is indicated to be bound.

After it is determined that the operation type is the drawing type, and the FB indicated to be bound is not the FB0, the following 306 to 309 are performed. If it is determined that the operation type is not the drawing type, there is no need to perform 306 to 309. If it is determined that the operation type is the drawing type, but the FB indicated to be bound is the FB0, some steps (reference may be made to the following 311 to 317) strongly related to the image quality enhancement processing may be performed.

306: The CPU stores an ID of the FB2 in the memory.

If in a glBindFrameBuffer function bound to the FB2, a value of a target type is GL_DRAW_FRAMEBUFFER or GL_FRAMEBUFFER, that is, is the drawing type, the CPU may store an ID of an FB currently indicated to be bound, namely, an ID in the glBindFrameBuffer function, in the memory. The ID stored in this case is an ID of a latest FB that indicates to perform a rendering operation of the drawing type during rendering of a current frame of image.

By using an example in which the ID in the glBindFrameBuffer function is 2, that is, if an FB (for example, the FB2) with an ID as 2 is indicated to be bound, 2 is stored in the memory.

307: The CPU sends the binding instruction for the FB2 to the GPU.

After receiving a binding instruction, the CPU sends the binding instruction to the GPU. The GPU may complete binding of an FB according to the binding instruction. Subsequently, after receiving a rendering instruction, the GPU may perform a rendering operation on the bound FB.

By using an example in which the binding instruction for the FB2 is currently intercepted by the CPU, the binding instruction for the FB2 is sent to the GPU. The GPU may bind the FB2 according to the binding instruction for the FB2, and may perform the rendering operation on the FB2 after receiving the rendering instruction subsequently.

A performing timing of the foregoing 307 is not limited to what shown in FIG. 3A-2, and during actual implementation, 307 may be performed between 305 and 306, or may be performed before 305.

In the foregoing 305, it is determined, only according to the binding instruction, that the operation type is the drawing type. However, actually, only when the gaming application delivers the rendering instruction to the CPU, whether the drawing operation is really about to be performed in the currently bound FB can be accurately determined.

After delivering the binding instruction for the FB, the gaming application further delivers the rendering instruction. In the rendering instruction, if the drawing operation is indicated to be performed, for example, rendering is indicated through a glDraw Elements function, it represents that the drawing operation is really about to be performed in the currently bound FB. In this case, the CPU may record the drawing ID. Exemplarily, the following 308 and 309 may be performed. In the rendering instruction, if the drawing operation is not indicated to be performed, for example, the glDraw Elements function is not included, the drawing ID is not recorded.

308: The CPU reads the ID of the FB2 from the memory in response to receiving a rendering instruction 1 delivered by the gaming application.

The rendering instruction 1 indicates to perform the drawing operation. The render command 1 may also be referred to as a third render command.

If a rendering instruction intercepted by the CPU indicates to perform the drawing operation, the CPU reads an ID of a currently recorded FB, for example, the ID of the FB2, from the memory.

309: The CPU stores the ID of the FB2, exemplarily stored as the drawing ID.

The drawing ID indicates an ID of an FB targeted by a latest drawing operation during rendering a current frame. Because the main gaming scene needs to be obtained through rendering through the drawing operation, after the drawing ID is recorded, only determining whether the FB indicated by the drawing ID is the target framebuffer is needed subsequently.

It should be noted that, in some other embodiments, alternatively, the ID of the FB2 may be stored as the drawing ID after the binding instruction for the FB2 is received, so that subsequent 308 and 309 may be omitted.

310: The CPU sends the rendering instruction 1 to the GPU.

After intercepting the rendering instruction 1, the CPU sends the rendering instruction 1 to the GPU. The GPU executes the rendering instruction 1, and may then perform the drawing operation on the currently bound FB. For example, the FB2 is currently bound, and then the GPU may execute the rendering instruction I to draw the main gaming scene on the FB2.

A performing timing of the foregoing 310 is not limited to what shown in FIG. 3A-2, and during actual implementation, 310 may be performed between 308 and 309, or may be performed before 308.

The foregoing 305-310 only use a render command (including the binding instruction and the rendering instruction for the FB2) for the FB2 as an example to describe the specific implementation of recording the drawing ID, while during rendering a frame of image, the gaming application delivers a render command for each FB, for example, a render command for the FB1 or a render command for the FB2 . . . . During actual implementation, after intercepting a render command (including the binding instruction and the rendering instruction for the FB) for any FB, the CPU determines whether an operation type is the drawing type, determines whether an FB indicated to be bound is the FB0, and performs, based on a determination result, a step of storing an ID of the FB, for example, performs 306. Further, the CPU determines whether the rendering instruction indicates to perform a drawing operation and stores a drawing ID based on the determination result, for example, performs 308 to 309. In addition, an ID of an FB stored afterward overwrites an ID of an FB stored previously, and a drawing ID stored afterward overwrites a drawing ID stored previously. Exemplarily, after 310 is performed, the CPU intercepts a binding instruction (which also may be referred to as a third binding instruction) for the FB3. In this case, it is determined that the operation type is the drawing type, and the FB3 instead of the FB0 is indicated to be bound, and then an ID (which also may be referred to as a third framebuffer identifier) of the FB3 may be stored, thereby overwriting the ID of the FB2 stored in 306. Afterward, the CPU intercepts the rendering instruction that indicates to perform the drawing operation, then the ID of the FB3 may be read from the memory, and the ID of the FB3 may be stored as the drawing ID, thereby overwriting the drawing ID stored in 309. In this way, the drawing ID may always indicate the only FB targeted by the currently latest drawing operation. The following embodiments are described by using an example in which a final drawing ID is the ID of the FB2.

It should be noted herein that, in the foregoing 305 to 310, when it is first determined that the operation type is the drawing type according to the binding instruction, and it is then determined that the rendering operation is the drawing operation according to the rendering instruction, the ID of the currently bound FB is finally stored as the drawing ID, so that accuracy of the stored drawing ID may be improved. However, in some other embodiments, alternatively, only when it is determined that the operation type is the drawing type according to the binding instruction, or only when it is determined that the rendering operation is the drawing operation according to the rendering instruction, the ID of the currently bound FB is finally stored as the drawing ID, so that a scheme procedure may be simplified.

According to another aspect, because image quality enhancement needs to be performed on the main gaming scene before the UI drawing (or the main gaming scene is drawn on the provided framebuffer, being the same in the following), the CPU all needs to determine whether the UI drawing is about to start after receiving the render command for each FB. For specific implementation of determining whether the UI drawing is about to start, reference may be made to the following 311.

311: The CPU determines, in response to receiving a binding instruction for the FB0 delivered by the gaming application, that an operation type is the drawing type, and an FB indicated to be bound is the FB0.

The binding instruction for the FB0 may also be referred to as a first binding instruction.

After the gaming application delivers a binding instruction for any FB, the CPU may intercept the binding instruction and determine, according to the binding instruction, whether the currently bound FB is used for the UI drawing. To be used for the UI drawing, the following conditions should be satisfied.

First, the UI drawing naturally needs the drawing operation to complete rendering, then the operation type of the rendering operation in the binding instruction should be the drawing type, namely, GL_DRAW_FRAMEBUFFER or GL_FRAMEBUFFER, instead of GL_READ_FRAMEBUFFER.

Second, the UI drawing needs to be completed in the provided framebuffer (for example, the FB0), then an ID in the binding instruction should indicate the provided framebuffer. In electronic devices with a same model, generally provided framebuffers are stationary. In electronic devices with different models, provided framebuffers may be different. For example, a provided framebuffer in a machine model a is the FB0, and a provided framebuffer in a machine model b is an FB100. In this embodiment, the provided framebuffer is the FB0, and then it needs to determine that the FB indicated to be bound is the FB0.

Based on this, the CPU may determine, through recognizing the operation type and the ID in the binding instruction, whether the currently bound FB is used for drawing a UI. If the operation type in the binding instruction is GL_DRAW_FRAMEBUFFER or GL_FRAMEBUFFER, and the ID in the binding instruction is a preset ID (the ID of the provided framebuffer), it is determined that the currently bound FB is used for drawing the UI.

An example in which the glBindFramebuffer function in the binding instruction for the FB0 is glBindFramebuffer (GL_FRAMEBUFFER,FB0) is used, where the operation type is GL_FRAMEBUFFER, namely, the drawing type. The ID of the FB is the FB0, that is, the FB0 is indicated to be bound. Therefore, it may be determined that the currently bound FB is used for drawing the UI.

312: The CPU sends the binding instruction for the FB0 to the GPU.

After intercepting a binding instruction, the CPU sends the binding instruction to the GPU. The GPU may complete binding of an FB according to the binding instruction. Subsequently, after receiving a rendering instruction, the GPU may perform a rendering operation on the bound FB.

By using an example in which the binding instruction for the FB0 is currently intercepted by the CPU, the binding instruction for the FB0 is sent to the GPU. The GPU may bind the FB0 according to the binding instruction for the FB0, and may perform the rendering operation on the FB0 after receiving the rendering instruction subsequently.

A performing timing of 312 is not limited to what shown in FIG. 3A-2. For example, alternatively, after intercepting the binding instruction, the CPU may first send the binding instruction to the GPU, and then determine whether the currently bound FB is used for drawing the UI. For another example, the CPU may send the binding instruction to the GPU at any timing between performing the following 313 to 317, for example, after 314.

After it is determined that the currently bound FB is used for drawing the UI, the following 313 to 317 need to be performed, to complete processing strongly related to image quality enhancement processing.

313: The CPU determines that an image quality enhancement model is not initialized, then a drawing size in the binding instruction for the FB0 is exemplarily stored as a resolution 2.

The image quality enhancement model is used for an operation of image quality enhancement. After a rendering result in the target framebuffer is input in the image quality enhancement model, the image quality enhancement model is run and an enhanced result may be output. A resolution of the enhanced result is higher than a resolution of the rendering result of the target framebuffer.

Generally, when it is the first time to determine that the image quality enhancement processing needs to be performed, for example, when it is the first time to determine the target framebuffer, the image quality enhancement model is initialized, so that it can be ensure that the initialized image quality enhancement model is effectively used. After determining that the currently bound FB is used for drawing the UI, the CPU determines whether the image quality enhancement model is initialized. If it is determined that the image quality enhancement model is not initialized, the resolution 2 (namely, a resolution of the UI, the same below) needs to be stored, to be used for initializing the image quality enhancement model. Conversely, if it is determined that the image quality enhancement model is initialized, there is no need to store the resolution 2.

In a specific implementation, the CPU may record a global variable for indicating that the image quality enhancement model is initialized and/or indicating that the image quality enhancement model is not initialized. Then, the CPU may search the global variable, and determine, based on a searching result, whether the image quality enhancement model is initialized. Exemplarily, when the CPU completes initialization of the image quality enhancement model, a global variable a is recorded. If the CPU finds the global variable a (also may be referred to as a first marker), it represents that the image quality enhancement model is initialized, and there is no need to store the resolution 2. Conversely, if the CPU does not find the global variable a, it represents that the image quality enhancement model is not initialized, and the resolution 2 needs to be stored, to be used for subsequently initializing the image quality enhancement model.

In FIG. 3A-1 and FIG. 3A-2, after the gaming application completes resource loading and enters a rendering stage, when the CPU determines, for the first time, that the currently bound FB is used for drawing the UI (for example, 311), obviously, it is not determined for the first time that the image quality enhancement processing is needed. In this case, the CPU determines that the image quality enhancement model is not initialized (for example, 313).

Besides the binding instruction and the rendering instruction, the render command for the provided framebuffer (for example, the FB0) may further include a resolution setting instruction. Exemplarily, in the resolution setting instruction, a glViewport function is invoked to define a drawing size when the rendering operation is performed. The drawing size is a resolution for drawing the UI, a resolution of the UI for short.

Exemplarily, the glViewport function is specifically glViewport (x0, y0, w0, h0), where x0 and y0 are original point (for example, left upper vertexes) coordinates, and w0 and h0 are respectively a width value and a height value of the drawing size. In this embodiment of this application, the image quality enhancement processing needs to be performed on the rendering result in the target framebuffer, and then enhanced content is drawn on the provided framebuffer, that is, pasted on the UI. Therefore, a resolution of the enhanced content needs to match the resolution of the UI. Through storing the resolution of the UI, the resolution of the UI may be used for a resolution of content output by an initialized image quality enhancement model.

In a specific implementation, the gaming application first invokes the glViewport function to deliver the resolution setting instruction, and then invokes the glBindFramebuffer function to deliver the binding instruction. In the implementation, after receiving the drawing size limited by the glViewport function, the CPU buffers the drawing size. Then, after receiving an operation type and an ID indicated by the glBindFramebuffer function, if determining that the currently bound FB is used for drawing the UI, the CPU may obtain the buffered drawing size and store the drawing size as the resolution of the UI. In this way, the resolution of the UI may be successfully stored.

314: The CPU records a marker location 1 in the memory, and the marker location 1 indicates that the FB0 is currently bound.

The marker location 1 may also be referred to as a second marker.

In this embodiment of this application, after intercepting the binding instruction for the FB0, besides sending the binding instruction for the FB0 to the GPU to implement binding of the FB0, the CPU further needs to perform other several steps (for example, 312, and 315 to 317 in the following). The rendering instruction is then processed. Therefore, after the several steps are performed, when the rendering instruction is subsequently received, to determine that the currently bound FB is still the FB0, the CPU may record the marker location 1 in the memory after determining that the currently bound FB is used for drawing the UI, where the marker location 1 is used for indicating that the FB0, namely, the provided framebuffer, is currently bound. Subsequently, if the bound FB changes, the CPU may remove the marker location 1. Exemplarily, after a binding instruction (also may be referred to as a fourth binding instruction, that is to say, a fourth framebuffer identifier that does not indicate the FB0 in the fourth binding instruction) that is delivered by the gaming application and indicates to bind another FB (an FB other than the FB0) is received, the marker location 1 may be deleted.

315: The CPU reads the drawing ID and the resolution 1 from the memory, and the drawing ID is the ID of the FB2.

The CPU determines that the currently bound FB is used for drawing the UI, then it represents that the UI drawing is about to start, and drawing the rendering result in the off-screen framebuffer on the provided framebuffer is also about to start. In this case, the CPU reads the drawing ID and the resolution 1, namely, the resolution of the main gaming scene, from the memory for determining whether an FB (also may be referred to as a to-be-processed framebuffer) indicated by the drawing ID is the target framebuffer. In this embodiment, by using an example in which the final drawing ID is the ID of the FB2, the read drawing ID is the ID of the FB2, and the FB indicated by the drawing ID is the FB2.

316: The CPU reads, from the GPU, the size of the texture attachment 1 and an ID of the texture attachment 1 that correspond to the ID of the FB2.

After creating the FB, the GPU further stores the identifier (for example, the ID) of the created FB, and the correspondence between the identifier (for example, the ID) of the texture attachment and the size of the texture attachment. Reference may be made to description of a related part in 304.

After the drawing ID is read, the GPU may obtain, according to the drawing ID, from the correspondence stored in the GPU, an ID of a texture attachment (namely, a texture attachment bound to the FB indicated by the drawing ID, which also may be referred to as a to-be-processed texture) and a size of the texture attachment that correspond to the drawing ID. In this embodiment, by using an example in which the drawing ID is the ID of the FB2, the size of the texture attachment 1 and the ID of the texture attachment 1 are obtained.

317: The CPU determines that the size of the texture attachment 1 is the same as the resolution 1, and determines that the image quality enhancement model is not initialized.

Only when the size of the texture attachment bound to the FB indicated by the drawing ID is consistent with the resolution of the main gaming scene, the FB indicated by the drawing ID can be used for rendering the main gaming scene. Conversely, it cannot. Based on this, if it is detected that the size of the texture attachment corresponding to the drawing ID is consistent with the resolution of the main gaming scene, it is determined that the FB indicated by the drawing ID is the target framebuffer, content drawn on the FB indicated by the drawing ID includes the main gaming scene, and a requirement for image quality enhancement processing exists. That is to say, the texture (for example, the first texture) bound to the target framebuffer needs to satisfy the preset condition. In this case, whether the image quality enhancement model is initialized needs to be determined again. If the image quality enhancement model is initialized, next there is no need to initialize the image quality enhancement model, and the initialized image quality enhancement model may be directly used for image quality enhancement processing. If the image quality enhancement model is not initialized, next the image quality enhancement model needs to be initialized first and can be used then.

In this embodiment, by using an example in which the drawing ID is the ID of the FB2, the texture attachment corresponding to the drawing ID is the texture attachment 1 bound to the FB2. In addition, the stored resolution of the main gaming scene, namely, the resolution 1, is also the size of the texture attachment 1. Apparently, the size of the texture attachment corresponding to the drawing ID is the same as the resolution of the main gaming scene.

If it is detected that the size of the texture attachment corresponding to the drawing ID is inconsistent with the resolution of the preset content, it is determined that the FB indicated by the drawing ID is not the target framebuffer, the content drawn on the FB indicated by the drawing ID does not include the main gaming scene, but may be some after effects (for example, bloom), and a requirement for image quality enhancement processing does not exist. For this situation, according to a normal rendering procedure, the rendering result in the off-screen framebuffer is drawn on the FB0, and the UI is drawn on the FB0. This situation is not much described in this specification.

After delivering the binding instruction for the FB0, the gaming application delivers the rendering instruction for which the rendering result in the off-screen framebuffer is drawn on the FB0. It is to be noted that, if off-screen rendering of a current frame of image is completed in a plurality of off-screen framebuffers, the application program delivers a rendering instruction for which rendering results of the plurality of off-screen framebuffers are all drawn on the FB0. However, in this embodiment of this application, the rendering result in the target framebuffer is drawn on the FB0 only after the image quality enhancement processing is performed on the rendering result in the target framebuffer. There is no need to perform the image quality enhancement processing on a rendering result of another off-screen framebuffer, which is drawn on the FB0 only according to the normal rendering procedure. Therefore, the following is described in detail mainly for a process of drawing the rendering result of the target framebuffer on the FB0.

After the gaming application delivers the rendering instruction (also may be referred to as a first rendering instruction) for which the rendering result in the target framebuffer is drawn on the FB0, the CPU intercepts the rendering instruction. In the rendering instruction for which the rendering result (also may be referred to as first image content) in the target framebuffer is drawn on the FB0, a glBindTexture function may be invoked to indicate the texture attachment stored in the rendering result in the target framebuffer, for example, the glBindTexture function includes the identifier (for example, the ID) of the texture attachment. And a glUseProgram may be invoked to indicate an executable program used in this rendering. The program is a program run on the GPU, and a function of the program is to indicate the GPU how a shader draws a graphic, for example, paints what color. In this embodiment, the target framebuffer is the FB2, and then the rendering instruction for which the rendering result in the target framebuffer is drawn on the FB0 is specifically: a rendering instruction (may be recorded as a rendering instruction 2, that is to say, the first rendering instruction is the rendering instruction 2) for which the rendering result (including the main gaming scene, which may be recorded as a rendering result 1, that is to say, the first image content is the rendering result 1) in the FB2 is drawn on the FB0. Refer to FIG. 3B, the rendering instruction 2 includes the following content:

glBindTexture (GL_TEXTURE_2D,120)//indicates obtaining the main gaming scene from a texture attachment with an ID as 120; and glUseProgram (101)//101 indicates that a program with an ID as 101 is used to complete rendering.

After performing 317 and intercepting the rendering instruction 2, the CPU initialize the image quality enhancement model through the following 318 to 321.

318: In response to receiving the rendering instruction 2 delivered by the gaming application, if the CPU reads the marker location 1 from the memory, the CPU further reads the resolution 2.

After intercepting the rendering instruction, the CPU may read the marker location 1 from the memory. If the marker location 1 can be read, it represents that the currently bound FB is still the FB0. In this case, the image quality enhancement processing can be normally performed. For example, the resolution of the UI, namely, the resolution 2, may be further read to initialize the image quality enhancement model. Conversely, if the marker location 1 is not read, it represents that the currently bound FB has changed. In this case, the current rendering instruction is discarded and not processed.

It needs to be noted herein that, in some other embodiments, the foregoing 314 may also be omitted. Correspondingly, after receiving the rendering instruction 2, the CPU may read the resolution of the UI. In this way, the scheme procedure may be simplified.

319: The CPU sends a resource initialize command 1 to the GPU.

In this embodiment of this application, algorithmic source code of the image quality enhancement model (the same as a first image quality enhancement model in the following, which also may be referred to as a second model) is integrated in a shader1 (shader1, which also may be referred to as a third shader). In addition, a compiling result of the shader 1 is bound (or attached) to a program1 (also may be referred to as a third program). Subsequently, when the image quality enhancement model needs to be used, the program1 may be invoked, and algorithm in the shader1 bound to the program1 may be used to perform a coloring operation on a vertex and/or a fragment in an image, to implement image quality enhancement of the main gaming scene.

The resource initialize command 1 may indicate to create the program1. Creating the program1 includes: creating the shader1, and integrating the algorithmic source code of the image quality enhancement model in the shader1: further, creating the program1, and binding the shader1 to the program1; and further, determining an ID of the program1. It should be understood that, when the GPU create a corresponding resource (for example, an FB, a texture, or a program), the GPU may set a corresponding ID, that is, determine an ID, for the resource.

An example of the resource initialize command 1 is shown as follows:

g_algoShader=glCreateShader (GL_COMPUTE_SHADER) // a shader object algoShader is created:

glShaderSource (algoShader, 1, &algoShaderBuffer, NULL) // the algorithmic source code of the image quality enhancement model is integrated in the shader object algoShader:

glCompileShader (algoShader) // the algorithmic source code of the shader algoShader is compiled:

g_algoProgram=glCreateProgram( ) // a program is created; and glAttachShader (algoProgram, algoShader) // a compiling result of the shader is bound (or attached) to the program.

Further, the rendering result is generally stored in the texture, and so is a rendering result (namely, an enhanced main gaming scene) after the image quality enhancement model is used to process the main gaming scene. For example, the enhanced main gaming scene is stored in a texture 2 (also may be referred to as a second texture). Correspondingly, the resource initialize command 1 may further indicate to create the texture 2 and determine an ID of the texture 2. It is to be noted that, the texture 2 is used for storing the enhanced main gaming scene, and the enhanced main gaming scene needs to be drawn on the FB0, that is, pasted on the UI. Then, a resolution of the enhanced main gaming scene should be equal to the resolution of the UI. Therefore, the texture 2 for storing the enhanced main gaming scene also should be equal to the resolution of the UI, namely, the resolution 2.

An example of creating a texture in the resource initialize command 1 is shown as follows:

glGenTextures (1, &algoTexture) // a texture object algoTexture is created:

glBindTexture (GL_TEXTURE_2D, algoTexture) // a type of the texture object algoTexture is set to be a GL_TEXTURE_2D type, namely, a 2D type; and glTexStorage2D (GL_TEXTURE_2D, 1, GL_RGBA8, width, height); // a width width and a height height of a size are allocated to the texture object, and the size is the resolution of the UI.

After receiving the resource initialize command 1, the GPU may create the texture 2, the shader1, and the program1, integrate the algorithm of the image quality enhancement model in the shader1, and bind the shader1 to the program1. In addition, the ID of the texture 2 and the ID of the program1 are determined. After completing these initialization processes, the GPU may return the ID the texture 2 and the ID of the program1 to the CPU, so that the CPU can request the GPU for the image quality enhancement processing subsequently.

320: The CPU receives the ID of the texture 2 and the ID of the program1 returned by the GPU.

321: The CPU transfers the resolution I and the resolution 2 to the GPU.

For example, the CPU may invoke a glUniform function to transfer the resolution 1 and the resolution 2 to the GPU.

After receiving the resolution 1 and the resolution 2, the GPU may initialize the image quality enhancement model. The GPU may configure the resolution I and the resolution 2 as model parameters of the image quality enhancement model in the program1, to indicate the image quality enhancement model, when the image quality enhancement processing is performed, to improve content from content with the resolution I to content with the resolution 2 and then output the content. That is to say, the GPU needs to initialize the image quality enhancement model according to the resolution 1 and the resolution 2.

322: The CPU sends an image quality enhance command to the GPU, and the image quality enhance command carries the ID of the texture attachment 1 and the ID of the program1.

The CPU sends the image quality enhance command to the GPU, and the image quality enhance command carries the ID of the texture attachment for storing the main gaming scene, to indicate a storage position of the to-be-processed main gaming scene. The texture attachment for storing the main gaming scene is a texture attachment bound to the target framebuffer. In this embodiment, the target framebuffer is the FB2, the texture attachment bound to the FB2 is the texture attachment 1, and then, the image quality enhance command carries the ID of the texture attachment 1. In addition, the image quality enhance command further carries the ID of the program1, to indicate to use the program1 to complete the image quality enhancement processing.

After receiving the image quality enhance command, the GPU invokes the program1 to perform the image quality enhancement processing on the main gaming scene, and obtains the enhanced main gaming scene. In this embodiment, the FB2 is the target framebuffer, and the main gaming scene is the rendering result 1 obtained through rendering in the FB2. In this way, the GPU executes the image quality enhance command, and then the rendering result I may be enhanced to obtain an enhanced rendering result (may be recorded as a rendering result 2, and also may be referred to as second image content). That is to say, the second image content is generated based on the first image content. In addition, the GPU may store the enhanced main gaming scene in the texture 2.

Through the foregoing steps, before the main gaming scene is drawn on the FB0, first the image quality enhancement processing needs to be performed on the main gaming scene (namely, the first image content) to generate the enhanced main gaming scene (namely, the second image content), and then the enhanced main gaming scene is drawn on the FB0. In this way, the enhanced main gaming scene can be displayed in a screen. Refer to the following 323 to 324 for details.

323: The CPU replaces the ID of the texture attachment 1 in the rendering instruction 2 with the ID of the texture 2, to obtain a rendering instruction 3.

The ID of the texture attachment 1 also may be referred to as a first texture identifier, the ID of the texture 2 also may be referred to as a second texture identifier, and the rendering instruction 3 also may be referred to as a second rendering instruction.

The CPU changes the rendering instruction and replaces a texture ID in the glBindTexture function with the ID of the texture 2.

In this embodiment, the target framebuffer is the FB2, and then the texture attachment for storing the main gaming scene before enhancement is the texture attachment 1 bound to the FB2, and the ID of the texture attachment 1 is carried in the glBindTexture function. The CPU may replace the ID of the texture attachment 1 with the ID of the texture 2, to obtain the rendering instruction 3.

Refer to FIG. 3B. It is assumed that the ID of the texture 2 is 140. The CPU replaces 120 in the glBindTexture function in the rendering instruction 2 with 140, and the glBindTexture function after the replacement is specifically a glBindTexture (GL_TEXTURE_2D,140), so that the CPU may indicate to obtain the enhanced main gaming scene from the texture with the ID as 140.

324: The CPU sends the rendering instruction 3 to the GPU.

The CPU sends the changed rendering instruction to the GPU, to indicate the GPU to draw content (namely, the enhanced main gaming scene) stored in the texture 2 on the FB0. After the GPU receives the changed rendering instruction, that the enhanced main gaming scene is drawn on the FB0 may be implemented.

When content in all off-screen framebuffers is drawn on the FB0, and after the UI drawing is completed on the FB0, a complete frame of image may be displayed in a display screen.

Then, image quality of a frame of image in the gaming application is enhanced.

In the embodiment shown in the foregoing FIG. 3A-1 to FIG. 3A-4, after the main gaming scene is rendered, before the UI drawing, the rendered main gaming scene is used as an input for image quality enhancement, and through operation on the image quality enhancement model by the GPU, image quality is improved and a high-quality image is output.

In the procedure shown in the foregoing FIG. 3A-1 to FIG. 3A-4, complete implementation from starting of the resource loading stage of the gaming application to completion of single image quality enhancement processing is described in detail. Then, as long as the process of the gaming application is not cleaned up, the initialized image quality enhancement model can be used continuously to perform the image quality enhancement processing during rendering of a subsequent frame of image. That is to say, subsequently, there is no need to initialize the image quality enhancement model again.

Figures 3, 3A:
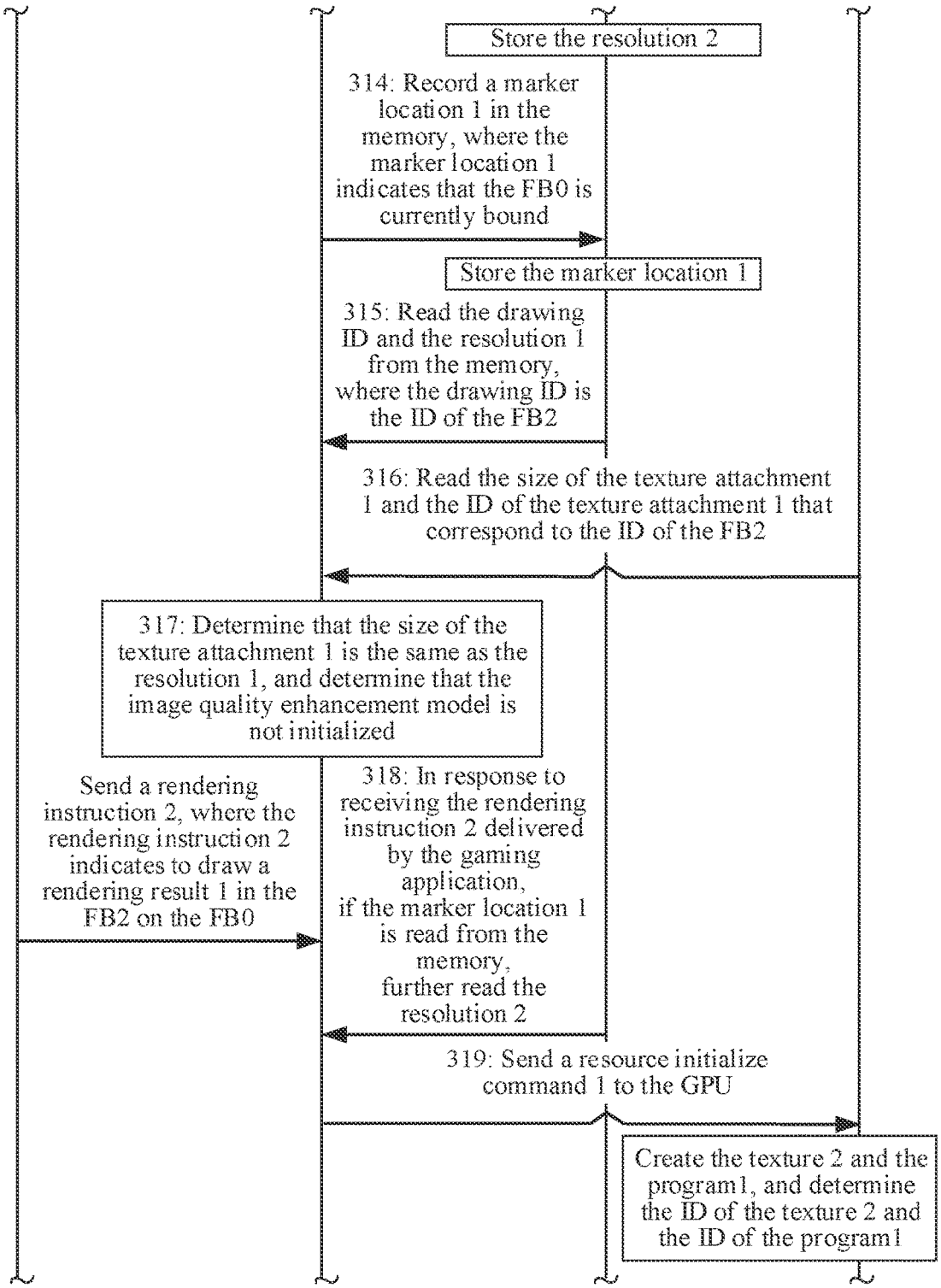
Figures 3, 3A, 4:
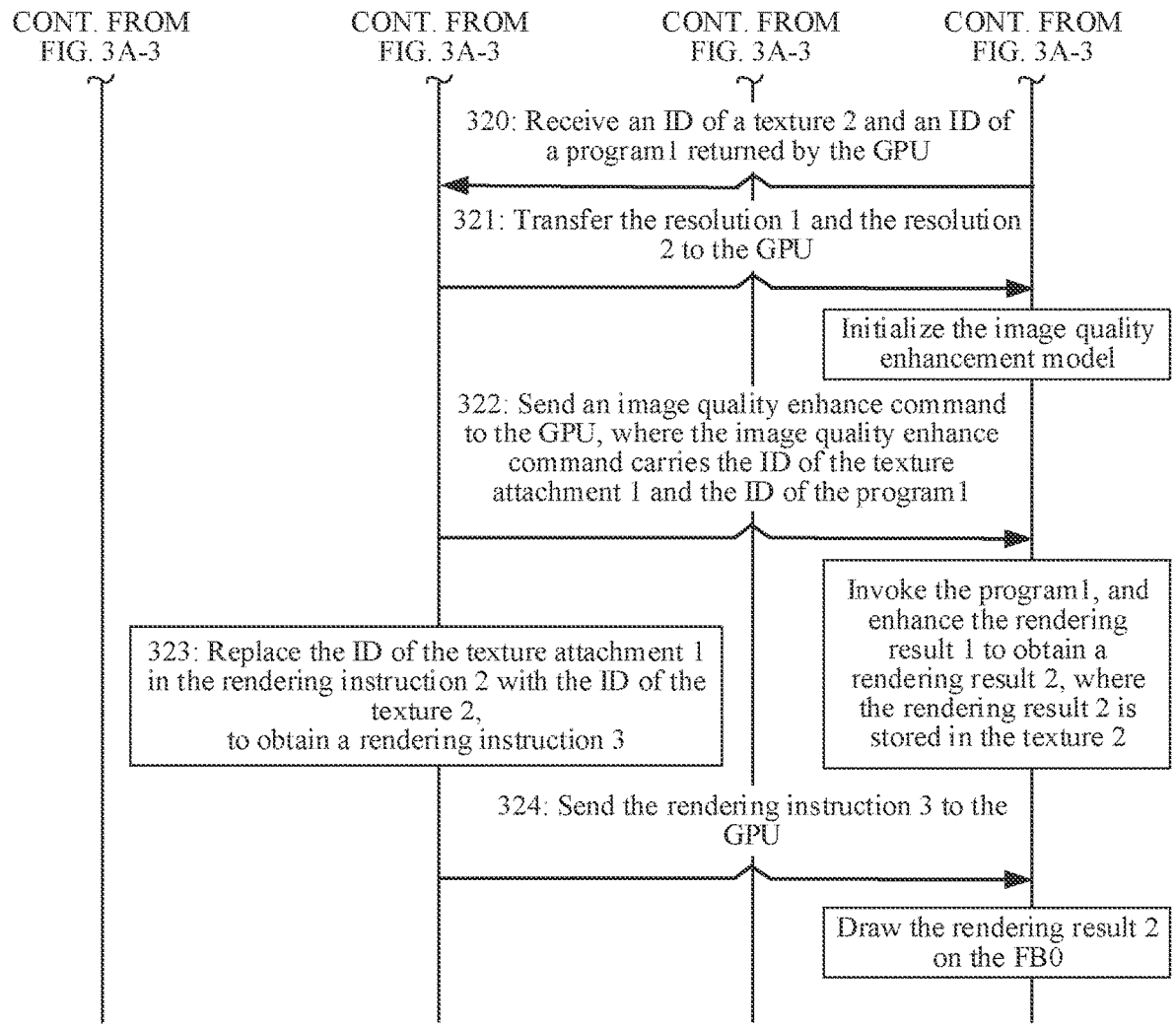
Figure 3B:
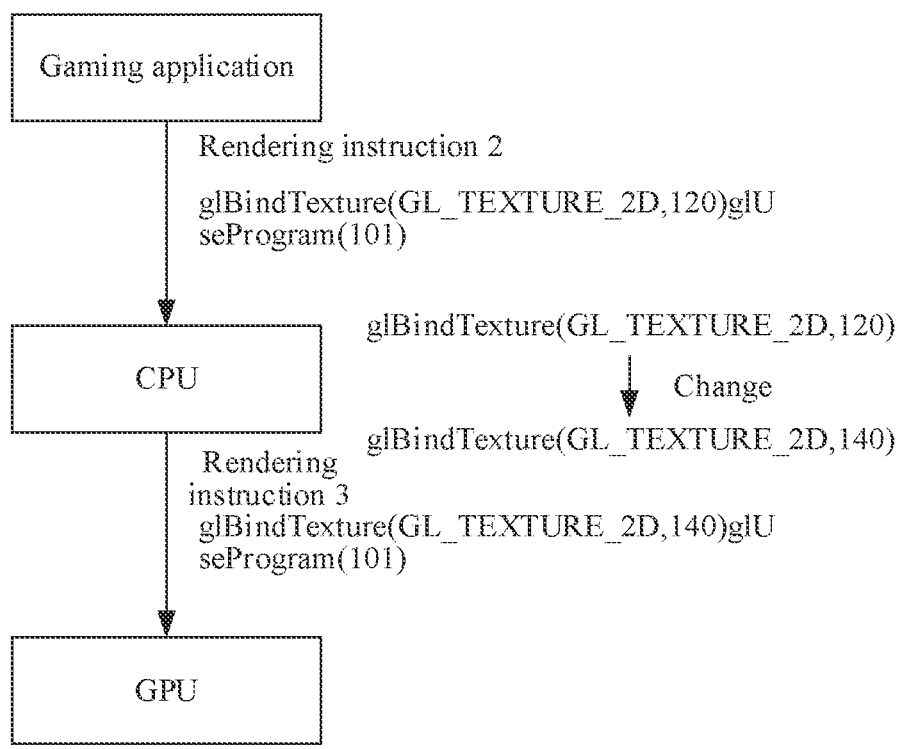
FIG. 3B is a schematic diagram of a principle of image processing according to an embodiment of this application.
Figures 1, 3C:
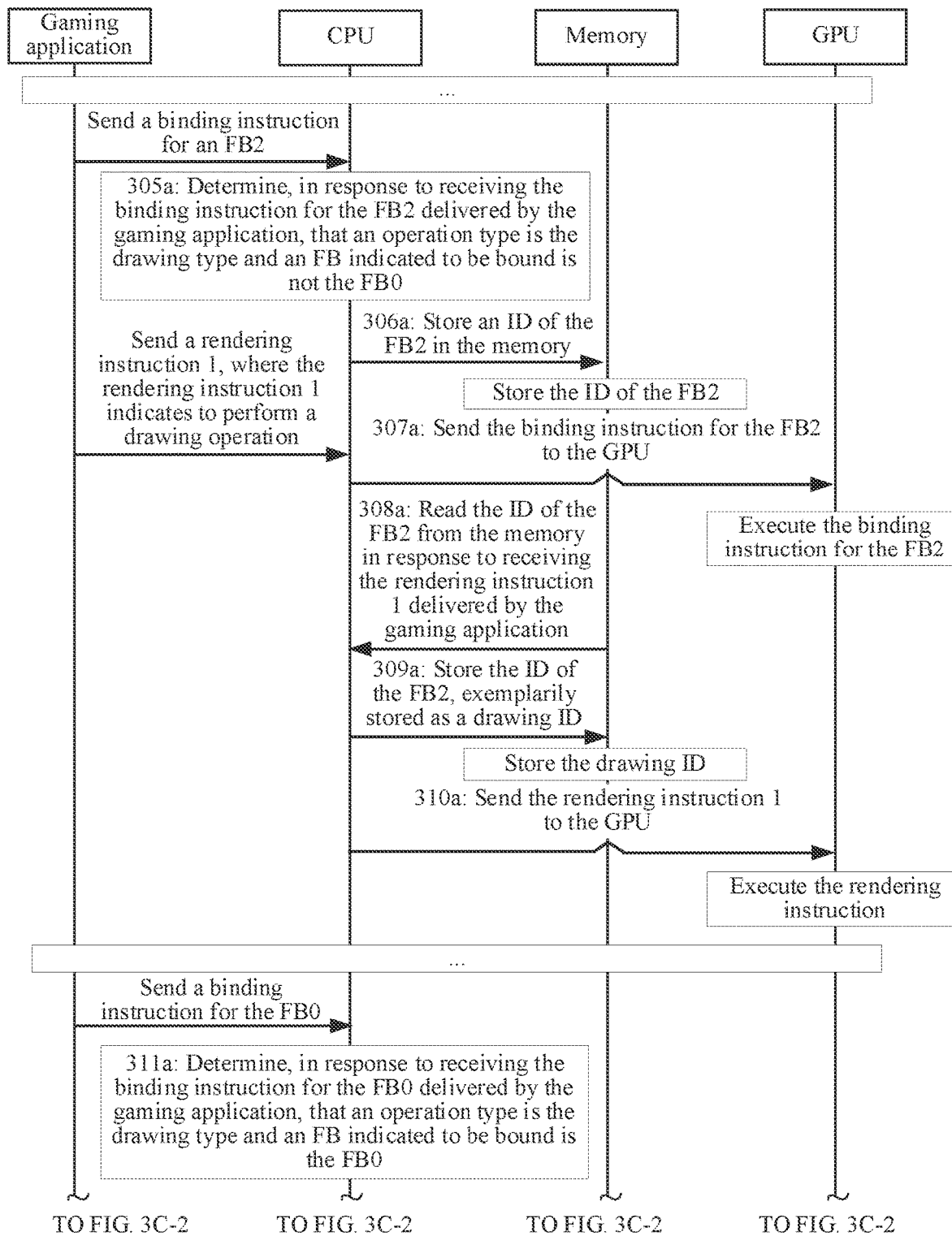
Figures 2, 3C:
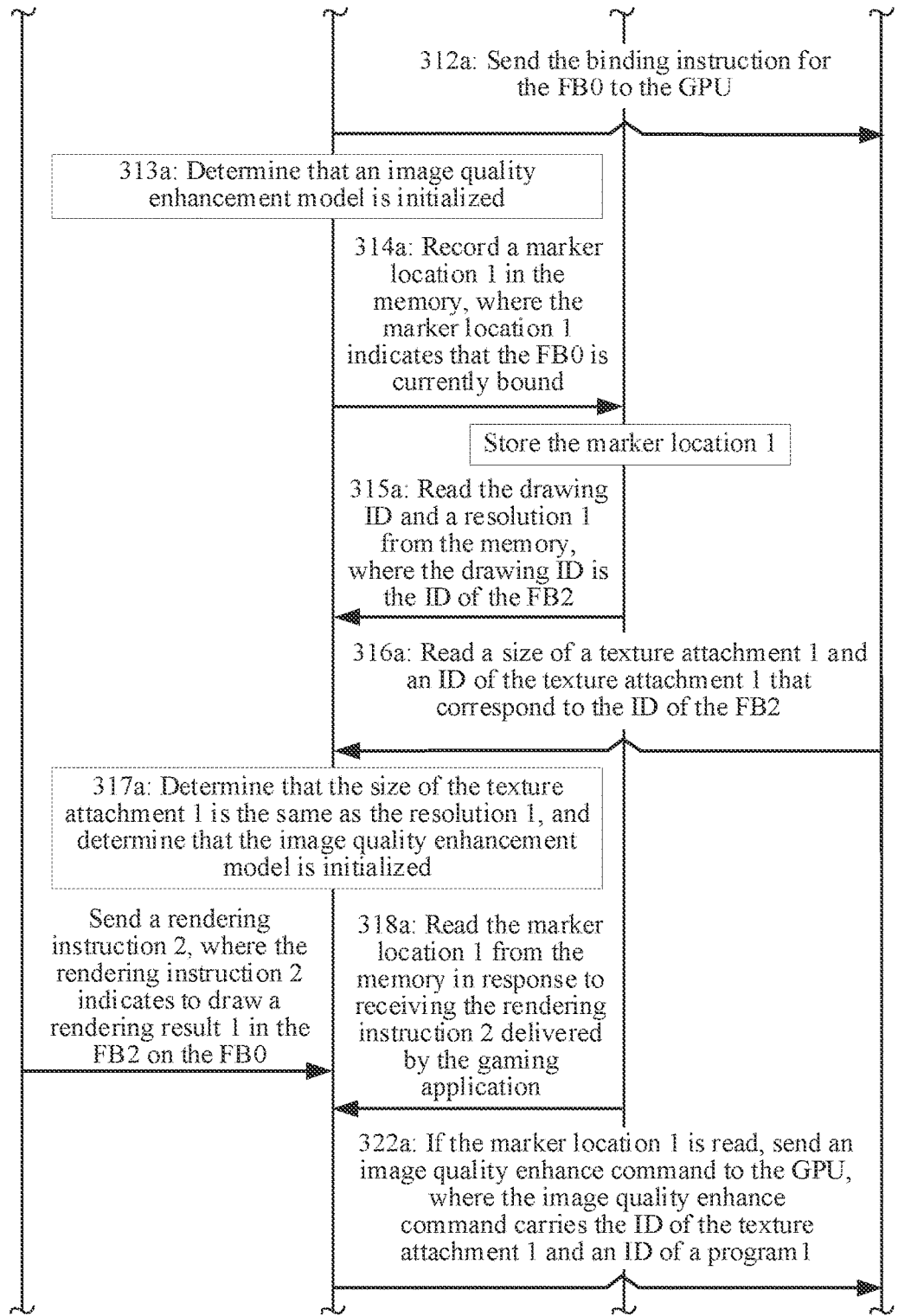
Figures 3, 3C:
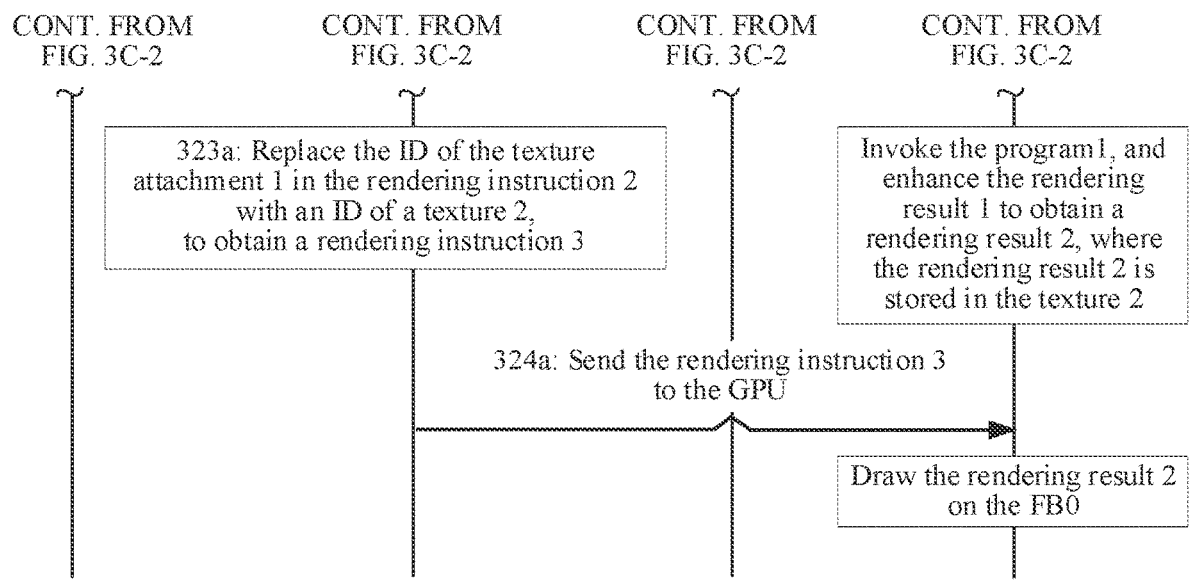

Exemplarily, FIG. 3C-1 to FIG. 3C-3 is a schematic flowchart of an image processing method according to an embodiment of this application. In this embodiment, a process of the second times of image quality enhancement processing and subsequent image quality enhancement processing is mainly described following completion of the first time of image quality enhancement processing in FIG. 3A-4. In this embodiment, an example in which rendering of a main gaming scene is completed in an FB2 and an FB0 is a provided framebuffer are still used for description. As shown in FIG. 3C-1 to FIG. 3C, the method may include the following steps.

305a: A CPU determines, in response to receiving a binding instruction for the FB2 delivered by a gaming application, that an operation type is a drawing type and an FB indicated to be bound is not the FB0. Refer to 305.

306a: The CPU stores an ID of the FB2 in a memory. Refer to 306.

307a: The CPU sends the binding instruction for the FB2 to a GPU. Refer to 307.

308a: The CPU reads the ID of the FB2 from the memory in response to receiving a rendering instruction 1 delivered by the gaming application. Refer to 308.

309a: The CPU stores the ID of the FB2, exemplarily stored as a drawing ID. Refer to 309.

310a: The CPU sends the rendering instruction 1 to the GPU. Refer to 310.

311a: The CPU determines, in response to receiving a binding instruction for the FB0 delivered by the gaming application, that an operation type is the drawing type, and an FB indicated to be bound is the FB0. Refer to 311.

312a: The CPU sends the binding instruction for the FB0 to the GPU. Refer to 312.

313a: The CPU determines that an image quality enhancement model is initialized.

The image quality enhancement model has been initialized when the image quality enhancement processing is performed for the first time in FIG. 3A-4. Then, during rendering of each subsequent frame of image, there is no need to use a resolution of a UI for completing initialization. Therefore, in this embodiment, after it is determined that the image quality enhancement model is initialized, there is no need to perform the step of storing a drawing size in the binding instruction for the FB0 as a resolution 2 in 313 in FIG. 3A-2.

314a: The CPU records a marker location 1 in the memory, and the marker location 1 indicates that the FB0 is currently bound. Refer to 314.

315a: The CPU reads the drawing ID and a resolution 1 from the memory, and the drawing ID is the ID of the FB2. Refer to 315.

316a: The CPU reads a size of a texture attachment 1 and an ID of the texture attachment 1 that correspond to the ID of the FB2. Refer to 316.

317a: The CPU determines that the size of the texture attachment 1 is the same as the resolution 1, and determines that the image quality enhancement model is initialized.

The image quality enhancement model has been initialized when the image quality enhancement processing is performed for the first time in FIG. 3A-4. Then, during the rendering of each subsequent frame of image, it is all determined that the image quality enhancement model is initialized.

318a: The CPU reads the marker location 1 from the memory in response to receiving a rendering instruction 2 delivered by the gaming application. Refer to 318.

Because the image quality enhancement model has been initialized, the steps of initialization, for example, 319 to 321, in FIG. 3A-3 and FIG. 3A-4 may be omitted.

322a: If the CPU reads the marker location 1, the CPU sends an image quality enhance command to the GPU, and the image quality enhance command carries the ID of the texture attachment 1 and an ID of a program1. Refer to 322.

323a: The CPU replaces the ID of the texture attachment 1 in the rendering instruction 2 with an ID of a texture 2, to obtain a rendering instruction 3. Refer to 323.

324a: The CPU sends the rendering instruction 3 to the GPU. Refer to 324.

Then, image quality of another frame of image is enhanced.

Subsequently, rendering of any frame of image may be processed repeatedly according to the procedure shown in the foregoing FIG. 3C-1 to FIG. 3C, until the gaming application is cleaned up. When the gaming application starts again, the rendering needs to be processed first according to the procedure shown FIG. 3A-1 to FIG. 3A-4 and then according to the procedure shown in FIG. 3C.

In foregoing embodiments in FIG. 3A-1 to FIG. 3C-3, that main gaming scenes are rendered in a same FB (for example, the FB2) during rendering of different frames of image is described. However, actually, the main gaming scenes may be rendered in different FBs during the rendering of different frames of image. For example, during rendering of a first frame of image, a main gaming scene in the first frame of image is rendered in the FB2. During rendering of a second frame of image, a main gaming scene in the second frame of image is rendered in an FB4. This is not specifically limited in the embodiments of this application.

In the foregoing embodiments in FIG. 3A-1 to FIG. 3C-3, the image quality enhancement processing (recorded as image quality enhancement processing in a first stage) is performed on the main gaming scene only before the main gaming scene is drawn on the FB0. In some other embodiments, to further improve the image quality, the image quality enhancement processing (recorded as image quality enhancement processing in a second stage) may be further performed during drawing the enhanced main gaming scene on the FB0. During the image quality enhancement processing in the first stage (namely, the embodiments in FIG. 3A-1 to FIG. 3C-3), mainly, the resolution of the main gaming scene is improved. During the image quality enhancement processing in the second stage, mainly, processing such as sharpening or noise reduction is performed on the main gaming scene.

Figures 1, 4A:
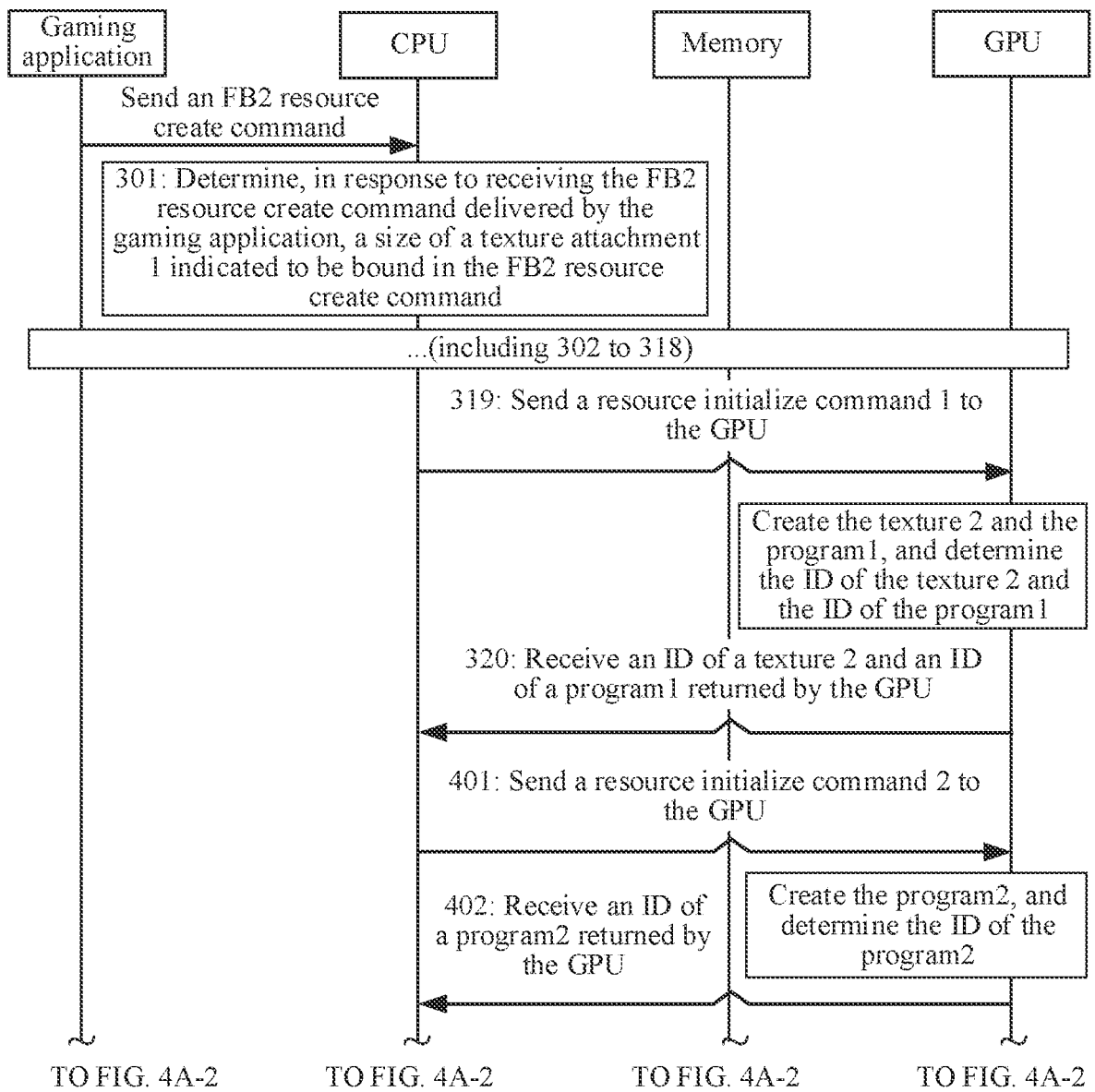
Figures 2, 4A:
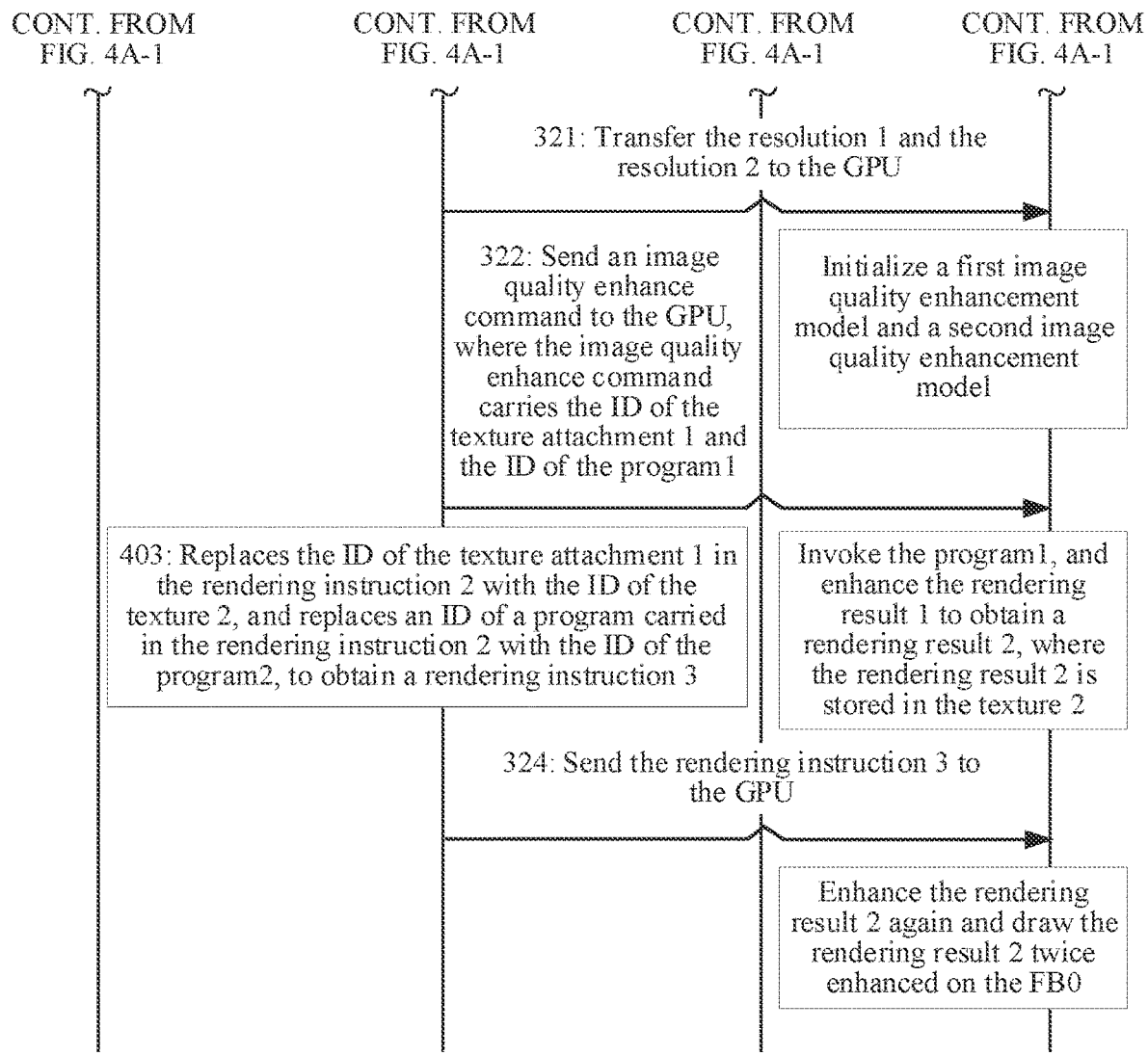

Exemplarily, FIG. 4A-1 and FIG. 4A-2 is a schematic flowchart of an image processing method according to an embodiment of this application. In this embodiment, the image quality enhancement processing in the first stage and the image quality enhancement processing in the second stage are completed in sequence. Different from the embodiment in FIG. 3A-1 to FIG. 3A-4, image quality enhancement processing in two stages are both involved in this embodiment. Therefore, image quality enhancement models, namely, a first image quality enhancement model and a second image quality enhancement model, respectively used in the two stages need to be initialized. The image quality enhancement model in FIG. 3A-1 to FIG. 3C-3 is the first image quality enhancement model for the image quality enhancement processing in the first stage, and mainly implements resolution improvement. The second image quality enhancement model is used for the image quality enhancement processing in the second stage, and mainly implements image sharpening and/or noise reduction.

Similar to the first image quality enhancement model, algorithmic source code of the second image quality enhancement model is integrated in a shader2. In addition, a compiling result of the shader2 is bound (or attached) to a program2. Subsequently, when the second image quality enhancement model needs to be used, the program2 may be invoked, and algorithm in the shader2 bound to the program2 may be used to perform a coloring operation on a vertex and/or a fragment in an image, to implement the image quality enhancement processing in the second stage.

Specifically, as shown in FIG. 4A-1, after 301 to 320 (reference may be made to description in FIG. 3A-1 to FIG. 3A-4) are completed, 401 and 402 are further included.

401: The CPU sends a resource initialize command 2 to the GPU.

The resource initialize command 2 may indicate to create the program2 (also may be referred to as a second program). Creating the program2 includes: creating the shader2 (also may be referred to as a second shader), and integrating the algorithmic source code of the second image quality enhancement model (also may be referred to as a first model) in the shader2: further, creating the program2, and binding the shader2 to the program2; and further, determining an ID (also may be referred to as a second program identifier) of the program2.

After receiving the resource initialize command 2, the GPU may create the shader2 and the program2, integrate the algorithmic source code of the image quality enhancement model in the shader2, and bind the shader2 to the program2. In addition, the ID of the program2 is determined. After completing these initialization processes, the GPU may return the ID of the program2 to the CPU, so that the CPU can request the GPU for the image quality enhancement processing in the second stage subsequently.

402: The CPU receives the ID of the program2 returned by the GPU.

Further, as shown in FIG. 4A-2, after 321 (reference may be made to description in FIG. 3A-4) is completed, the GPU needs to initialize the first image quality enhancement model and the second image quality enhancement model, instead of initializing only the first image quality enhancement model.

For initialization of the first image quality enhancement model, reference may be made to related description in FIG. 3A-3 and FIG. 3A-4, and details are not described herein again.

After the image quality enhancement processing in the first stage is implemented by using the first image quality enhancement model, the image quality enhancement processing in the second stage may be implemented continuously by using the second image quality enhancement model, to draw the enhanced main gaming scene on which the processing such as sharpening or noise reduction is performed on the FB0. That is to say, an output of the first image quality enhancement model is an input of the second image quality enhancement model. Then, a resolution corresponding to input content (namely, the main gaming scene) of the second image quality enhancement model should be the resolution of the UI, namely, the resolution 2. In addition, there is no need to improve the resolution for using the second image quality enhancement model. Therefore, a resolution corresponding to output content of the second image quality enhancement model also should be the resolution of the UI, namely, the resolution 2. Based on this, after receiving the resolution 1 and the resolution 2, the GPU may configure the resolution 2 as a model parameter of the second image quality enhancement model in the program2, to indicate the second image quality enhancement model, when the image quality enhancement processing is performed, to make the input content with the resolution 2 output still with the resolution 2, thereby completing initialization of the second image quality enhancement model.

It is to be noted that, when the first image quality enhancement model and the second image quality enhancement model are initialized, some other model parameters, for example, a sharpening parameter, may further need to be initialized. These model parameters may also be transferred by the CPU to the GPU. Then the GPU stores the model parameters in a corresponding image quality enhancement model, thereby implementing initialization of these parameters.

As shown in FIG. 4A-2, after model initialization is completed, first 321 and 322 (reference may be made to description in FIG. 3A-4) need to be performed, to complete the image quality enhancement processing in the first stage. Then, the image quality enhancement processing in the second stage further needs to be completed. Specifically, 323 in FIG. 3A-4 may be 403.

403: The CPU replaces the ID of the texture attachment 1 in the rendering instruction 2 with the ID of the texture 2, and replaces an ID of a program carried in the rendering instruction 2 with the ID of the program2, to obtain a rendering instruction 3.

The program carried in the rendering instruction 2 may be referred to as a first program, and the ID of the program carried in rendering instruction 2 also may be referred to as a first program identifier. The first program identifier indicates the first program, the first program is used for drawing an image according to a first shader bound to the first program, the first model is not integrated in the first shader, and the first model is used for image sharpening processing and/or noise reduction processing.

In this embodiment, the image quality enhancement processing, for example, the sharpening processing, may be further performed during drawing the enhanced main gaming scene on the FB0. Therefore, based on replacing a texture ID in the glBindTexture function with the ID of the texture 2, an ID in a glUseProgram function needs to be replaced with the ID of the program2. In this way, the GPU can be indicated to enhance the enhanced main gaming scene again by using the program2 and draw the main gaming scene enhanced twice on the FB0, to complete the image quality enhancement processing in the second stage.

Figure 4B:
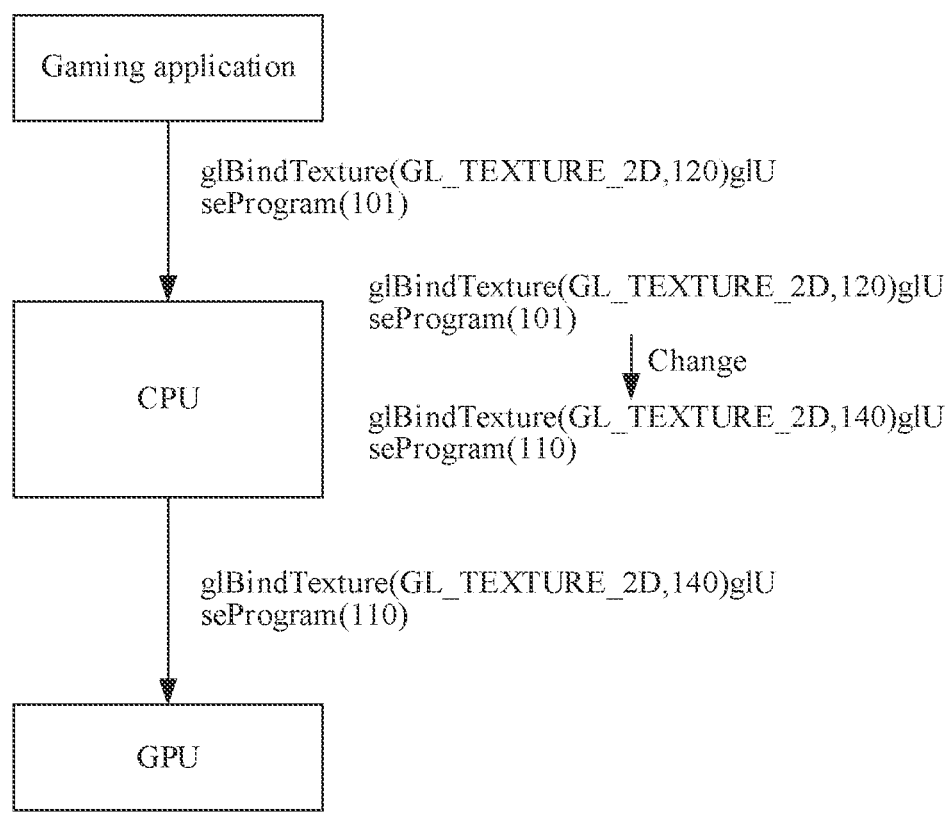
FIG. 4B is a schematic diagram of a principle of another image processing according to an embodiment of this application.

Refer to FIG. 4B. The gaming application delivers the rendering instruction for which the rendering result in the FB2 is drawn on the FB0, where the rendering instruction includes the following content:

glBindTexture (GL_TEXTURE_2D,120)//indicates obtaining the main gaming scene from a texture attachment with an ID as 120; and glUseProgram (101)//indicates that a program with an ID as 101 is used to complete drawing.

The GPU needs to replace the ID in the glBindTexture function in the rendering instruction with the ID of the texture 2. Refer to FIG. 4B, the ID of the texture 2 is 140, and then the glBindTexture function after the replacement is specifically a glBindTexture (GL_TEXTURE_2D,140), thereby indicating to obtain the enhanced main gaming scene from the texture 2. In addition, the CPU needs to replace the ID in the glUseProgram function in the rendering instruction with the ID of the program2. Refer to FIG. 4B. The ID of the program2 is 110, and then the glUseProgram function after the replacement is specifically a glUseProgram (110), thereby indicating to use the program2 to enhance the enhanced main gaming scene again and draw the main gaming scene enhanced twice on the FB0.

As shown in FIG. 4A-2, after the foregoing 403 is completed, the CPU may perform 324 (reference may be made to FIG. 3A-4), and send to the GPU the rendering instruction 3 obtained through a change.

After receiving the rendering instruction 3, the GPU may perform processing such as sharpening and/or noise reduction on the enhanced main gaming scene and draw the main gaming scene enhanced twice on the FB0, that is, the main gaming scene on which the sharpening processing and/or the noise reduction processing are/is performed is drawn on the FB0, to further improve gaming image quality.

In some scenes, when a game version is changed, during drawing the main gaming scene on the FB0, the image quality enhancement processing such as sharpening or noise reduction may no longer be suitable to perform. For example, after the game version changes, a style of a gaming image is transformed from a bright style into a dark style. In this case, if during drawing the main gaming scene on the FB0, a sharpened image quality enhancement model is used to complete sharpening processing on the main gaming scene and draw the sharpened main gaming scene on the FB0, a gaming image displayed finally may not be of the dark style. In this way, apparently, this is inappropriate.

Based on this, in some embodiments, before 403 of the embodiment shown in the foregoing FIG. 4A-1 and FIG. 4A-2, the CPU may verify the program that draws the main gaming scene on the FB0. Whether the program is an expected program is verified. If the program is the expected program, it represents that the image quality enhancement processing is suitable to further perform during drawing the main gaming scene on the FB0. In this case, 403 may be continuously performed. If the program is not the expected program, the image quality enhancement processing is not performed in the second stage. In this case, reasonability of the image quality enhancement processing may be improved.

It should be noted that, in some other embodiments, the image quality enhancement processing may be performed in only the first stage, and not be performed in the first stage. Or, in still some other embodiments, the image quality enhancement processing including resolution improvement, and sharpening and/or noise reduction may be completed simultaneously in a same stage (for example, the first stage or the second stage). This is not specifically limited in the embodiments of this application.

In this embodiment of this application, the image quality enhancement model may be a fixed model configured for the gaming application. For example, an image quality enhancement model a is configured for a gaming application 1, and an image quality enhancement model 2 is configured for a gaming application 2. Or, for a same gaming application, the image quality enhancement model may be dynamically adjusted. For example, the image quality enhancement model may be dynamically adjusted according to an enhancement level and/or an enhancement mode set by a user. For another example, the image quality enhancement model may be dynamically adjusted according to a load parameter, for example, a temperature, of an electronic device. This is not specifically limited in this embodiment of this application.

Figure 5:
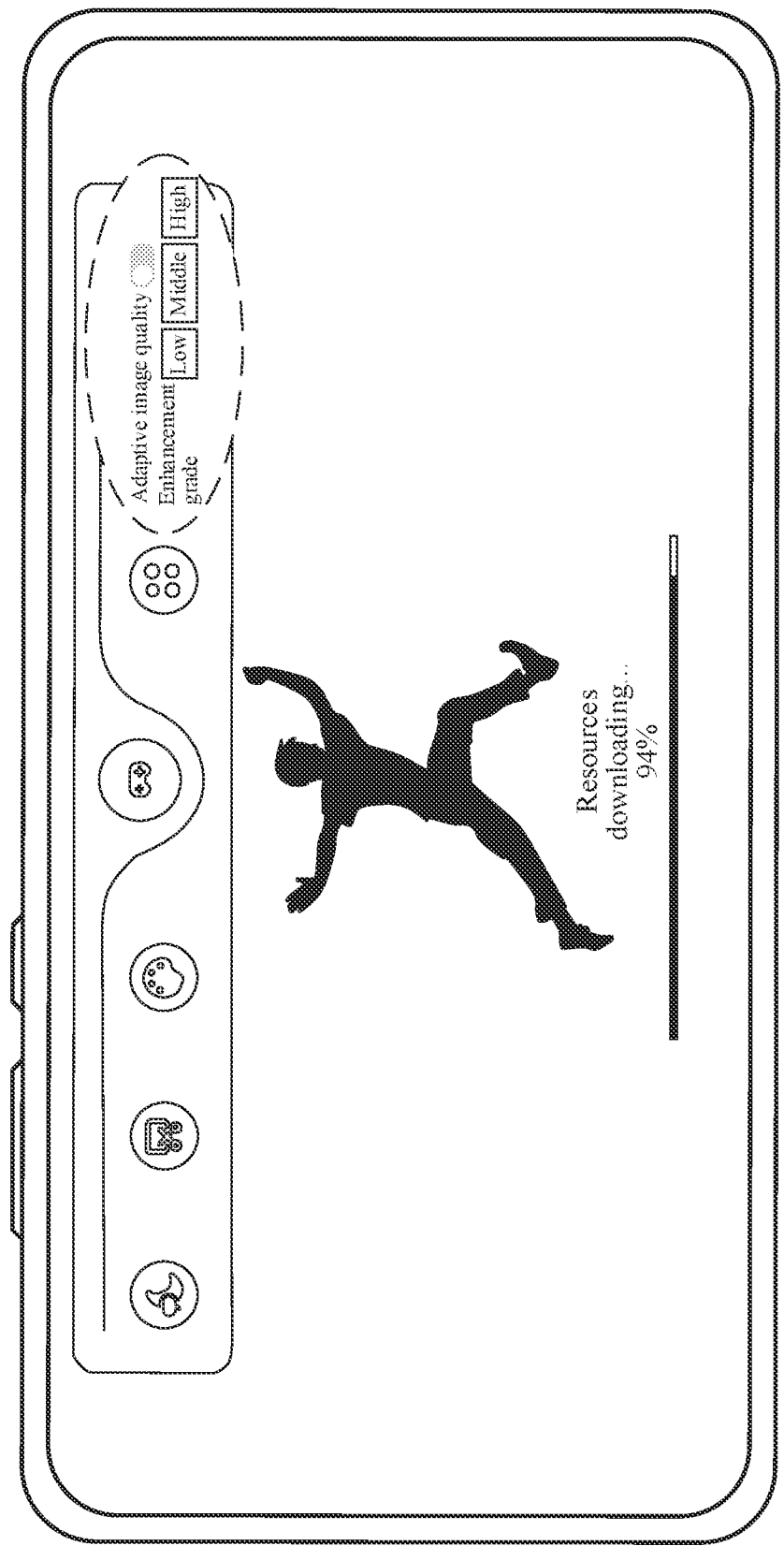
FIG. 5 is a schematic diagram of an image quality enhancement setting interface according to an embodiment of this application.

Refer to FIG. 5. Specific implementation of the image processing method according to the embodiments of this application is further described by using an example in which the image quality enhancement model is dynamically adjusted according to the image quality enhancement level and/or the image quality enhancement mode set by the user. In a setting (for example, a game assistant) of the gaming application, a setting option for image quality enhancement may be provided. As shown in FIG. 5, after the gaming application starts in a mobile phone, two enhancement modes (shown by elliptic dotted lines in the figure) are provided in the setting: an adaptive image quality mode and a fixed enhancement grade mode.

In the fixed enhancement grade mode, the electronic device may choose the image quality enhancement model according to an enhancement level chosen by the user. Refer to FIG. 5 continuously. To-be-chosen enhancement levels (namely, enhancement grades) include three levels: "low", "middle", and "high". If the user chooses the "middle" enhancement level, an image quality enhancement model with a moderate enhancement effect is needed for match.

In the adaptive image quality mode, the electronic device may collect load parameters of the electronic device, such as a temperature, a load of the CPU, and a load of the GPU during rendering. For example, the electronic device may periodically collect the temperature of the electronic device. For another example, the electronic device may collect the load of the CPU and/or the load of the GPU each time after displaying one frame of image. Then, a matching image quality enhancement model is automatically chosen according to these load parameters. In a specific implementation, the electronic device may estimate, according to these load parameters, a load when the electronic device renders a next frame of image, and then a matching image quality enhancement model is automatically chosen according to an estimation result. Generally, if an enhancement effect of the image quality enhancement model is stronger, higher power consumption is required generally. Therefore, when a matching image quality enhancement model is automatically chosen, if a load of the electronic device reflected by the load parameter is lower, for example, the temperature is lower, an image quality enhancement model with a stronger enhancement effect is chosen, thereby ensuring an image quality enhancement effect when the load of the electronic device is low. In the adaptive image quality mode, the electronic device dynamically adjusts the image quality enhancement model according to the load parameter collected in real time. In this way, when the loads are different, different image quality enhancement models may be chosen to complete operation of image quality enhancement, to balance the enhancement effect and the load of the electronic device.

That is to say, in the embodiment in which the image quality enhancement model is dynamically adjusted, there are a plurality of image quality enhancement models provided to be chosen. Then, creation of corresponding resources (for example, programs) and initialization need to be completed for the plurality of image quality enhancement models.

Figure 6A:
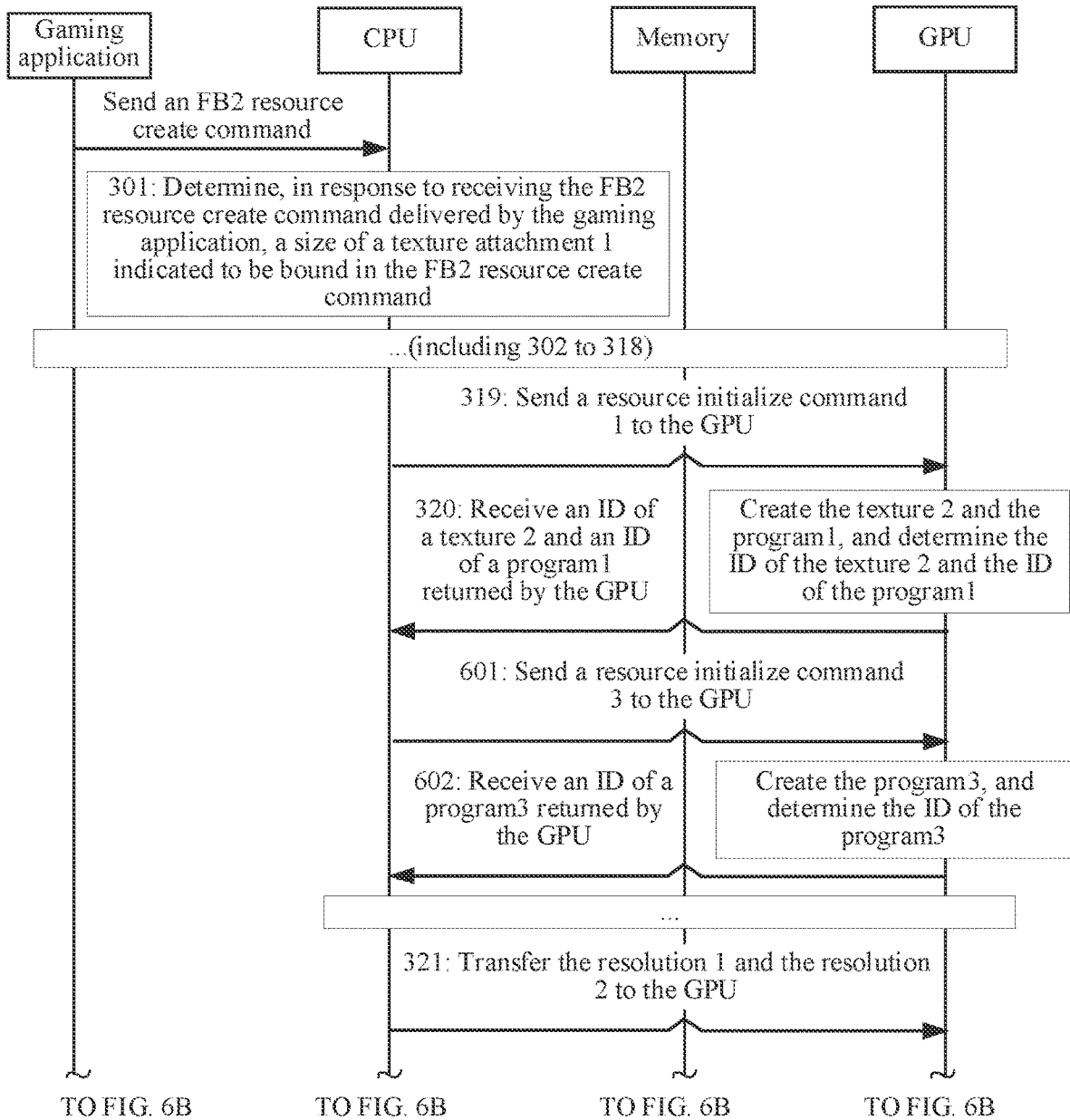
FIG. 6A and FIG. 6B is a schematic flowchart of another image processing method according to an embodiment of this application.

In a specific implementation, the creation of corresponding resources for all the image quality enhancement models may be centrally completed, and initialization of all the image quality enhancement models may be centrally completed. As shown in FIG. 6A, after 301 to 318 (reference may be made to description in FIG. 3A-1 to FIG. 3A-3) are completed, resource creation and initialization of the image quality enhancement models may be centrally completed.

319: The CPU sends a resource initialize command 1 to the GPU. Refer to FIG. 3A-3.

320: The CPU receives an ID of a program3 returned by the GPU. Refer to FIG. 3A-4.

After the foregoing resource creation for one image quality enhancement model is completed, resource creation for next image quality enhancement model may be completed. As shown in 601 to 602:

601: The CPU sends a resource initialize command 3 to the GPU.

602: The CPU receives the ID of the program3 returned by the GPU.

It is to be noted that, after 602, the resource creation for next image quality enhancement model may be completed continuously, which is not enumerated herein. For specific implementation of resource creation for the image quality enhancement model, reference may be made to related description in FIG. 3A-1. Details are not described herein again. However, it should be noted that, for rendering of one frame of image, only one enhanced main gaming scene is output. Therefore, only one texture, for example, the texture 2, needs to be created. There is no need to create a texture resource for each image quality enhancement model.

After resource creation for all image quality enhancement models are completed, the CPU may record correspondences between the image quality enhancement models and resources of the image quality enhancement models, for example, a correspondence between an image quality enhancement model and an ID of a program bound to the model, thereby facilitating that the ID of the carried program is determined when an image quality enhancement instruction is sent subsequently.

As shown in FIG. 6A, after the resource creation is completed, 321 may be performed, to send the resolution I and the resolution 2 to the GPU. After receiving the resolution 1 and the resolution 2, the GPU may initialize the image quality enhancement model. For initialization of the image quality enhancement model, reference may be made to related description in FIG. 3A-3 and FIG. 3A-4, and details are not described herein again.

Figure 6B:
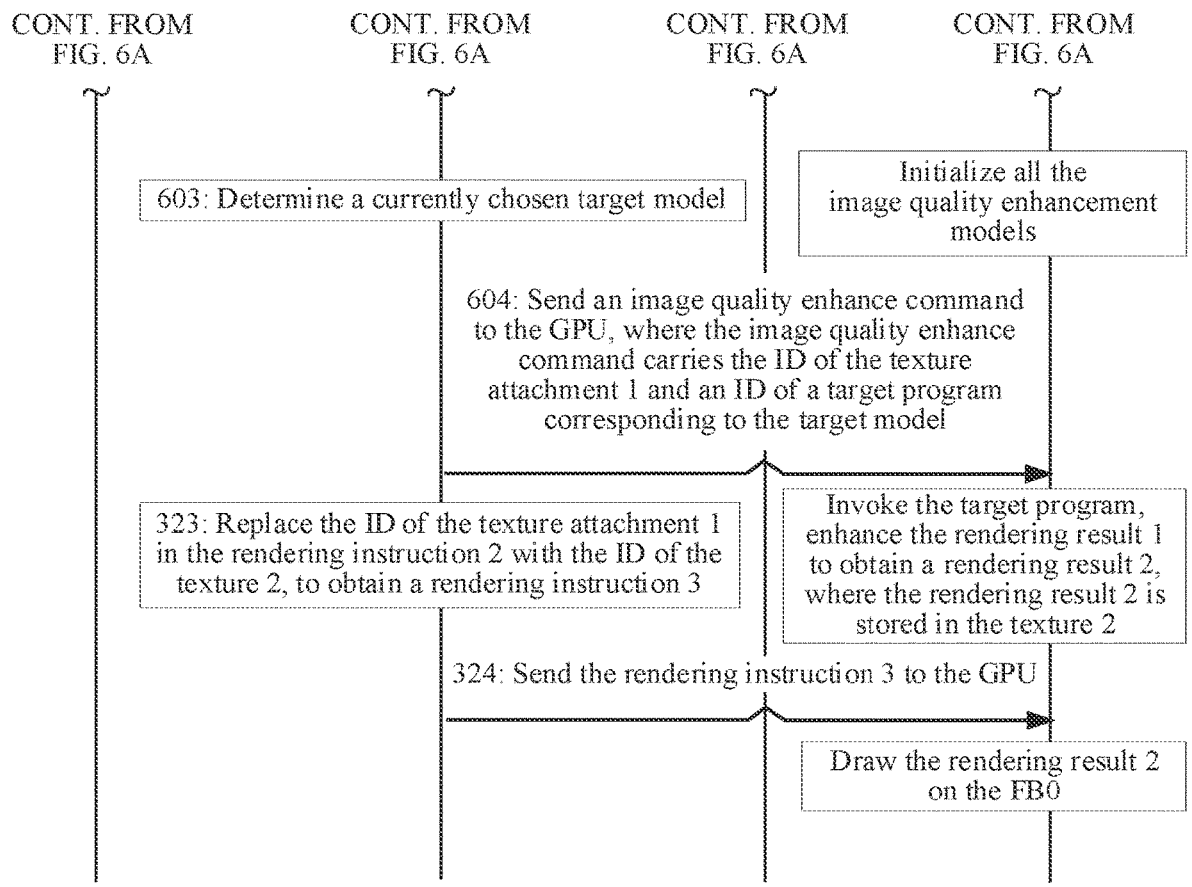

As shown in FIG. 6B, the method further includes 603.

603: The CPU determines a currently chosen target model.

The CPU may choose the target model according to the enhancement level and/or the enhancement mode set by the user.

A performing timing of the foregoing 603 is not limited to what shown in FIG. 6B, and during actual implementation, as long as the performing time is before 604.

Further, in the embodiments in which the image quality enhancement model is dynamically adjusted, if image quality enhancement models used by two adjacent times of image quality enhancement processing are different, and an enhancement effect difference between the different image quality enhancement models is obvious, image quality transition is caused. For example, the image quality is transient from poor to great. To resolve the problem, in some embodiments, when the image quality enhancement model is dynamically adjusted, a multi-grade transition manner may be used for the adjustment, to make the image quality enhancement effect transitioned smoothly. That is to say, if a currently chosen model and a model used last time are a preset combination, the CPU may adjust the currently chosen model to make a difference between enhancement effects corresponding to an adjusted target model and the model used last time is less than a preset difference value. A difference between enhancement effects corresponding to the two models in the preset combination is greater than the preset difference value.

As shown in FIG. 6B, 322 in FIG. 3A-4 is specifically as follows.

604: The CPU sends an image quality enhance command to the GPU, and the image quality enhance command carries the ID of the texture attachment 1 and an ID of a target program corresponding to the target model.

For example, the target model is an image quality enhancement model 3, a program created for the image quality enhancement model 3 is the program3, and then the ID of the program3 may be carried in the image quality enhancement instruction.

In using this embodiment, an image quality enhancement model matching a user setting may be used each time to complete the image quality enhancement processing.

The embodiment in FIG. 6A and FIG. 6B is described by using an example in which the resource creation and the initialization of the image quality enhancement models are centrally completed. During actual implementation, alternatively, only one times of resource creation and initialization that correspond to the currently chosen target model may be completed. Afterward, when the chosen target model changes, resource creation and initialization that correspond to the changed target model need to be completed again. This is not specifically limited in this embodiment of this application.

Figure 7:
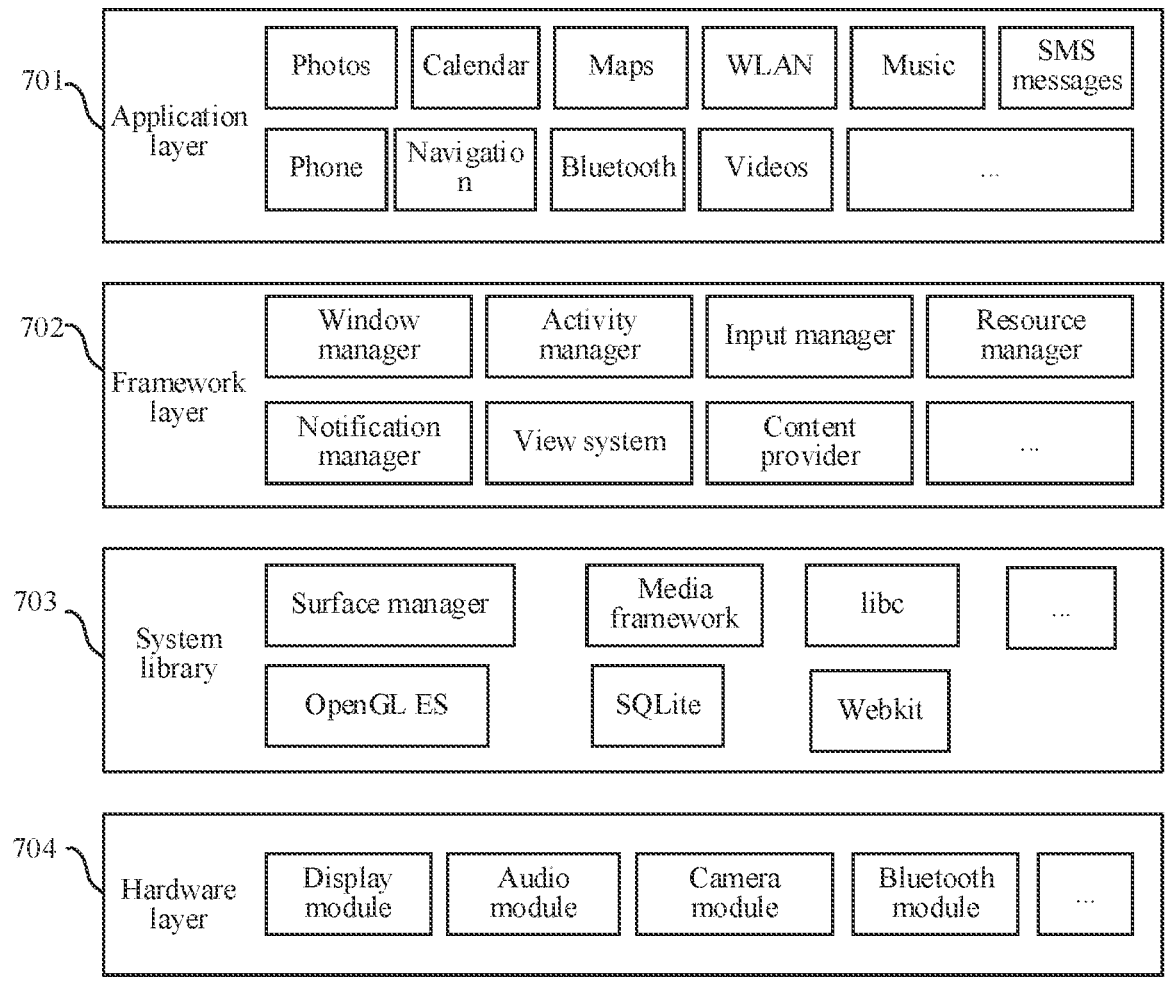
FIG. 7 is block diagram of a software structure of an electronic device according to an embodiment of this application.

FIG. 7 is block diagram of a software structure of an electronic device according to an embodiment of this application. As shown in FIG. 7, the electronic device may include an application layer 701, a framework layer 702, a system library 703, a hardware layer 704, and the like.

The application layer 701 also may be referred to as an application program layer, or an application (APP) layer. In some implementation, the application program layer may include a series of application program packages. The application program packages may include application programs such as camera, photos, calendar, phone, maps, navigation, WLAN, Bluetooth, music, videos, and SMS messages. The application program packets may further include an application program that shows a picture or a video in requirement of rendering an image. For example, an application program included in the application layer 701 may be a game-type application program, for example, Genshin Impact®, Game for Peace®, or Honor of Kings®.

The framework layer 702 also may be referred to as an application program framework layer. The framework layer 702 may provide an application programming interface (API) and a programming framework for the application program at the application layer 701. The framework layer 702 includes some predefined functions.

Exemplarily, the framework layer 702 may include a window manager, a content provider, a view system, a resource manager, a notification manager, an activity manager, an input manager, and the like. The window manager provides a window manager service (WMS), and the WMS may be used for window management, window animation management, surface management, and a transfer station as an input system. The content provider is configured to store and obtain data and make the data accessible to an application program. The data may include a video, an image, audio, calls made and answered, a browsing history and bookmarks, an address book, and the like. The view system includes visual controls such as a control for displaying a text and a control for display an image. The view system may be configured to construct an application program. A display interface may include one or more views. For example, a display interface including a short message notification icon may include a view for displaying a text and a view for displaying a picture. The resource manager provides various resources such as a localized character string, an icon, a picture, a layout file, and a video file for an application program. The notification manager enables an application program to display notification information in a status bar. The notification manager may be configured to convey a message of a notification type, where the message may disappear automatically after a short stay without user interaction. For example, the notification manager is configured to notify a user of download completion or remind a user of a message. The notification manager may alternatively display a notification in a form of a chart or a scroll bar text in a status bar at the top of the system, for example, a notification of an application program run in the background, or may display a notification in a form of a dialog window on the screen. For example, text information is prompted on a status bar, a prompt tone is made, the electronic device vibrates, or an indicator light flashes. The activity manager may provide an activity manager service (AMS), and the AMS may be used for starting, switching, and scheduling of a system assembly (for example, an activity, a service, a content provider, and a broadcast receiver) and management and scheduling work of an application process. The input manager may provide an input manager service (IMS), and the IMS may be used for a management system input, for example, a touch screen input, a button input, or a sensor input. The IMS takes out an event from an input device node, and allocates the event to an appropriate window by interacting with the WMS.

The system library 703 may include a plurality of function modules, for example, a surface manager, a media framework, a standard C library (libc), an OpenGL for embedded systems (OpenGL ES), a Vulkan, an SQLite, and a Webkit.

The surface manager is configured to manage a display subsystem and provide fusion of 2D and 3D layers for a plurality of application programs. The media framework supports playback and recording in a plurality of commonly used audio and video formats, static image files, and the like. A media library may support a plurality of audio and video encoding formats, for example, moving pictures experts group 4 (MPEG4). H.264, moving pictures experts group audio layer3 (MP3), advanced audio coding (AAC), joint photographic experts group (JPEG or JPG), and portable network graphics (PNG). The OpenGL ES and/or the Vulkan provide(s) drawing and operation of 2D graphics and 3D graphics in an application program. The SQLite provides a lightweight relational database for an application program of the electronic device. In some implementation, the OpenGL in the system library 703 provides a rendering function, and may render a to-be-displayed image according to a render command delivered by an application program.

In an example in FIG. 7, the electronic device may further include the hardware layer 704. The hardware layer 704 includes a processor, a central processing unit (CPU), a graphics processing unit (GPU), a neural-network processing unit (NPU), and the like.

Figure 8:
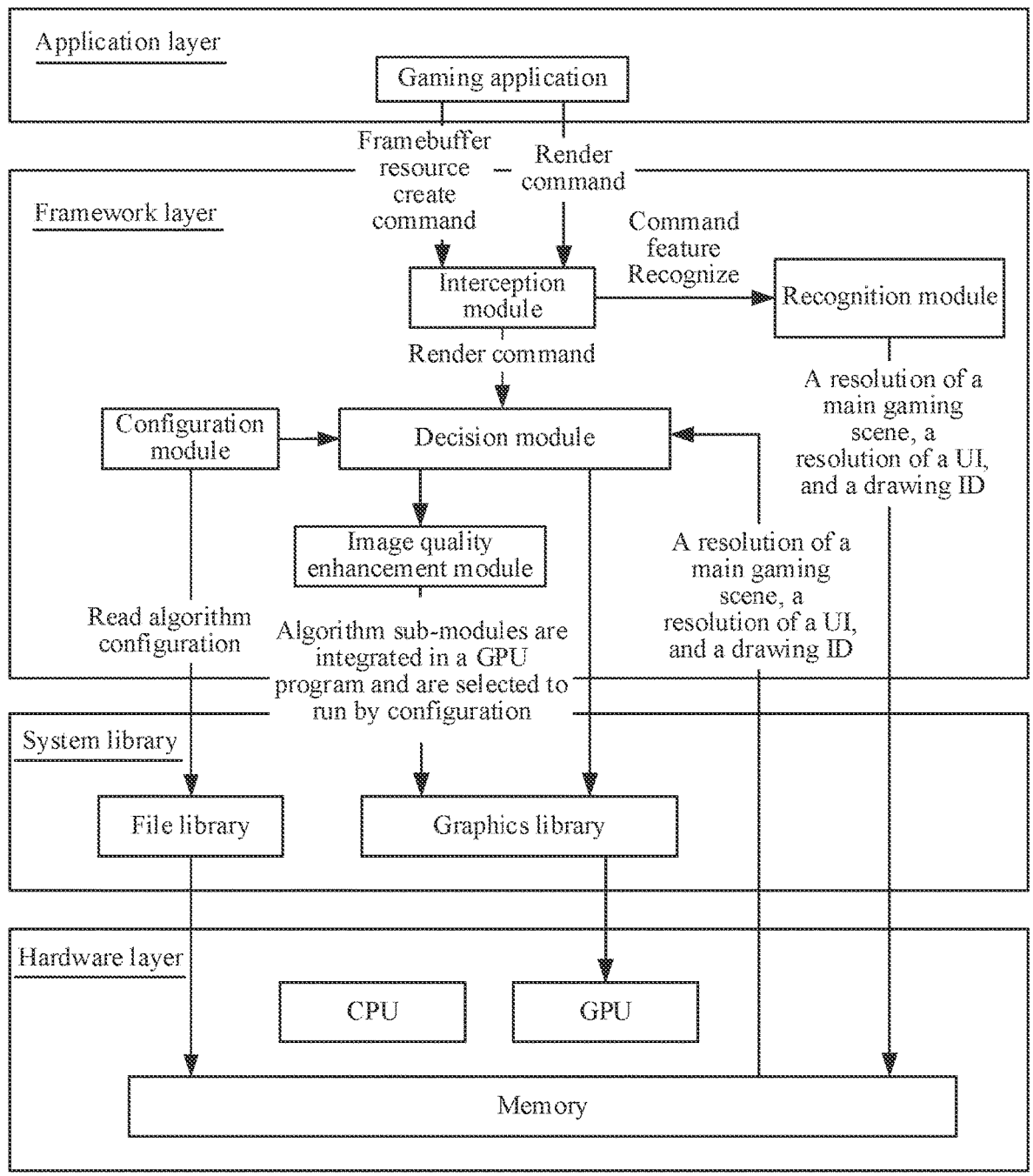
FIG. 8 is a schematic diagram of a principle of an image processing method according to an embodiment of this application.

Further, Refer to FIG. 8. One or a plurality of functional modules may be configured in a framework layer, for implementing an image processing scheme according to an embodiment of this application. Exemplarily, an interception module, a recognition module, a decision module, a configuration module, an image quality enhancement module, and the like may be configured in the framework layer. In addition, a CPU in the hardware layer may control each of the foregoing modules in the framework layer to implement functions thereof. A GPU or an NPU may perform corresponding rendering processing according to APIs in a graphics library (for example, the OpenGL ES) invoked by instructions processed by each module in the framework layer. The following further describes the image processing method according to the embodiments of this application in detail with reference to each module.

As shown in FIG. 8, a gaming application in an application layer delivers a framebuffer resource create command during loading resources. The framebuffer resource create command is used for creating a framebuffer corresponding to an image, and makes preparation for subsequent image rendering. After the resource loading ends, when the gaming application needs to display the image, the gaming application delivers a render command. It should be understood that, the render command may include a binding instruction and a rendering instruction for the FB that are delivered in sequence.

The interception module in the framework layer may intercept the framebuffer resource create command and the render command that are delivered by the gaming application. The interception module may further send the framebuffer resource create command and the render command to the recognition module in the framework layer after intercepting the framebuffer resource create command and the render command. In addition, the render command is sent to the decision module in the framework layer.

The recognition module may determine a resolution of a main gaming scene according to the received framebuffer resource create command and store the resolution of the main gaming scene in a memory. The recognition module may further determine a resolution of a UI and a drawing ID according to the received render command and store the resolution of the UI and the drawing ID in the memory. The resolution of the main gaming scene and the resolution of the UI may be used for initializing an image quality enhancement model. The resolution of the main gaming scene and the drawing ID may be used for determining whether image quality enhancement processing needs to be performed.

The decision module may determine, according to the received render command, whether the image quality enhancement processing needs to be performed, that is, determine whether a size of a texture attachment corresponding to the drawing ID is the same as the resolution of the main gaming scene. If the same, it is determined that the image quality enhancement processing needs to be performed, and then the render command is sent to the image quality enhancement module in the framework layer. If not the same, there is no need to perform the image quality enhancement processing, and then the graphics library is directly invoked to complete rendering.

The configuration module in the framework layer may read an image quality enhancement model configured for a current gaming application from a file library in the system library, and send a read module configuration result to the image quality enhancement module.

The image quality enhancement module may send an image quality enhance command to the GPU according to the received render command and model configuration, to request to invoke a corresponding program to perform the image quality enhancement processing. In addition, the image quality enhancement model may further change the render command and send the changed render command to the GPU.

Finally, the GPU may implement image quality enhancement on the main gaming scene according to the image quality enhance command. In addition, the GPU may draw the enhanced main gaming scene on a provided framebuffer according to the changed render command.

FIG. 9A-1 to FIG. 9B-2 is a flowchart of an image processing method according to an embodiment of this application. The method is applicable to an electronic device having a software structure shown in FIG. 8. The electronic device includes a gaming application, an interception module, a recognition module, a decision module, a configuration module, an image quality enhancement module, a CPU, a GPU, and a memory, where the interception module, the recognition module, the decision module, the configuration module, and the image quality enhancement module are modules controlled by the CPU and may be modules in the CPU.

As shown in FIG. 9A-1 to FIG. 9B-2, the method includes the following steps.

- 900: The interception module receives a framebuffer resource create command.
- 901: The interception module sends the framebuffer resource create command to the recognition module.
- 902: The recognition module determines a size of a texture attachment indicated to be bound in the framebuffer resource create command.
- 903: The recognition module determines whether the size of the texture attachment satisfies a preset condition. If yes, 904 is performed; and if no, 900 and subsequent steps are continuously performed for next framebuffer resource create command.
- 904: The recognition module stores the size of the texture attachment, exemplarily stored as a resolution 1.

The resolution 1 is a resolution of a main gaming scene.

- 905: The interception module receives a binding instruction for an FB.

A render command generally includes a binding instruction and a rendering instruction.

After intercepting the binding instruction for the FB, according to an aspect, the interception module may send the binding instruction to the recognition module.

- 906: The interception module sends the binding instruction for the FB to the recognition module.
- 907: The recognition module determines whether an operation type in the binding instruction for the FB is a drawing type, and determines whether an FB indicated to be bound is an FB0. If the operation type is the drawing type, and the FB indicated to be bound is not the FB0, 908 is performed: otherwise, 908 is not performed.
- 908: The recognition module stores an ID of the FB indicated to be bound in the memory.

After intercepting the binding instruction for the FB, according to another aspect, the interception module may send the binding instruction to the decision module.

- 909: The interception module sends the binding instruction for the FB to the decision module.
- 910: The decision module determines whether the operation type in the binding instruction for the FB is the drawing type, and determines whether the FB indicated to be bound is the FB0. If the operation type is the drawing type, and the FB indicated to be bound is the FB0, the decision module performs 911: otherwise, the decision module does not perform processing.
- 911: The decision module determines whether an image quality enhancement model is initialized. If not initialized, 912 and subsequent steps are performed; and if initialized, 912 is skipped, and 913 and subsequent steps are performed.
- 912: The decision module stores a drawing size of the FB indicated to be bound, exemplarily stored as a resolution 2.

The resolution 2 is a resolution of a UI.

- 913: The decision module records a marker location 1 in the memory.
- 914: The decision module reads a drawing ID and the resolution 1 from the memory.

It should be noted that, the flowchart in this embodiment is described mainly according to flows of data between the modules. Although storage of the drawing ID occurs in a subsequent step 922, in an actual rendering process, the render command for each FB is delivered in sequence, and the render command for any FB includes the binding instruction and the rendering instruction that are delivered in sequence. Therefore, before 914 is performed, for a render command for another FB, 922 may have been performed and then the drawing ID may be recorded. For example, the FB0 needs to be bound currently, for a render command for an FB2, 922 has been performed, and the FB2 is recorded as the drawing ID.

- 915: The decision module reads a size of a texture attachment and an ID of the texture attachment that correspond to the drawing ID from the GPU.
- 916: The decision module determines whether the size of the texture attachment corresponding to the drawing ID is the same as the resolution 1. If the same, the decision module performs 917; and if different, the decision module does not perform processing.
- 917: The decision module determines whether the image quality enhancement model is initialized. If not initialized, the decision module performs 924 and subsequent steps; and if initialized, the decision module omits 925, 926, and 928.
- 918: The interception module receives a rendering instruction.

After intercepting the rendering instruction, according to an aspect, the interception module sends the rendering instruction to the recognition module.

- 919: The interception module sends the rendering instruction to the recognition module.
- 920: The recognition module determines whether the rendering instruction indicates to perform a drawing operation. If yes, the recognition module performs 921; and if no, the recognition module does not perform processing.

921: The recognition module reads the stored ID of the FB from the memory.

922: The recognition module stores the read ID of the FB, exemplarily stored as the drawing ID.

After intercepting the rendering instruction, according to another aspect, the interception module sends the rendering instruction to the decision module.

923: The interception module sends the rendering instruction to the decision module.

924: The decision module records the marker location 1 from the memory. If read, the decision module performs 921; and if not read, the decision module does not perform processing.

925: The decision module reads a resolution 2 from the memory.

926: The decision module sends a resource initialize command 1 to the GPU, and the resource initialize command 1 is used for creating a texture 2 and a program1.

927: The image quality enhancement module receives an ID of the texture 2 and an ID of the program1 that are returned by the GPU.

928: The decision module transfers the resolution 1 and the resolution 2 to the GPU.

929: The decision module sends the rendering instruction to the image quality enhancement module.

930: The image quality enhancement module sends an image quality enhance command to the GPU, and the image quality enhance command carries the ID of the texture attachment corresponding to the drawing ID and the ID of the program1.

931: The image quality enhancement module replaces the ID of the texture attachment corresponding to the drawing ID with the ID of the texture 2, to obtain a changed rendering instruction.

932: The image quality enhancement module sends the changed rendering instruction to the GPU.

For a specific implementation method of the foregoing 900 to 932, reference may be made to related description in FIG. 3A-1 to FIG. 3A-4 and FIG. 3C-1 to FIG. 3C-3, and details are not described herein again. It may be understood that, execution sequences shown in the foregoing embodiments are merely schematic and do not constitute any limitation, and some steps in the embodiments also may be omitted.

Figures 1, 9A:
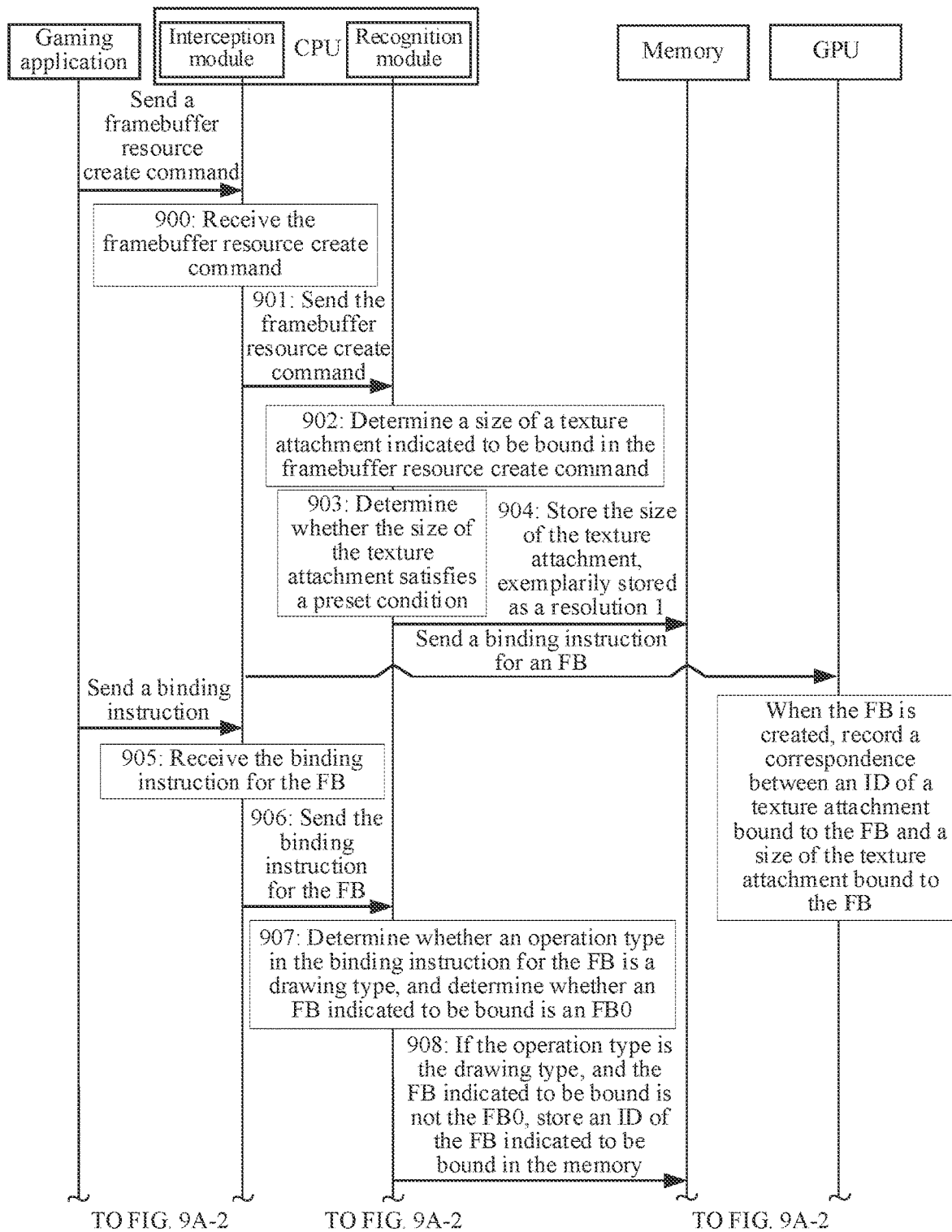
Figures 2, 9A:
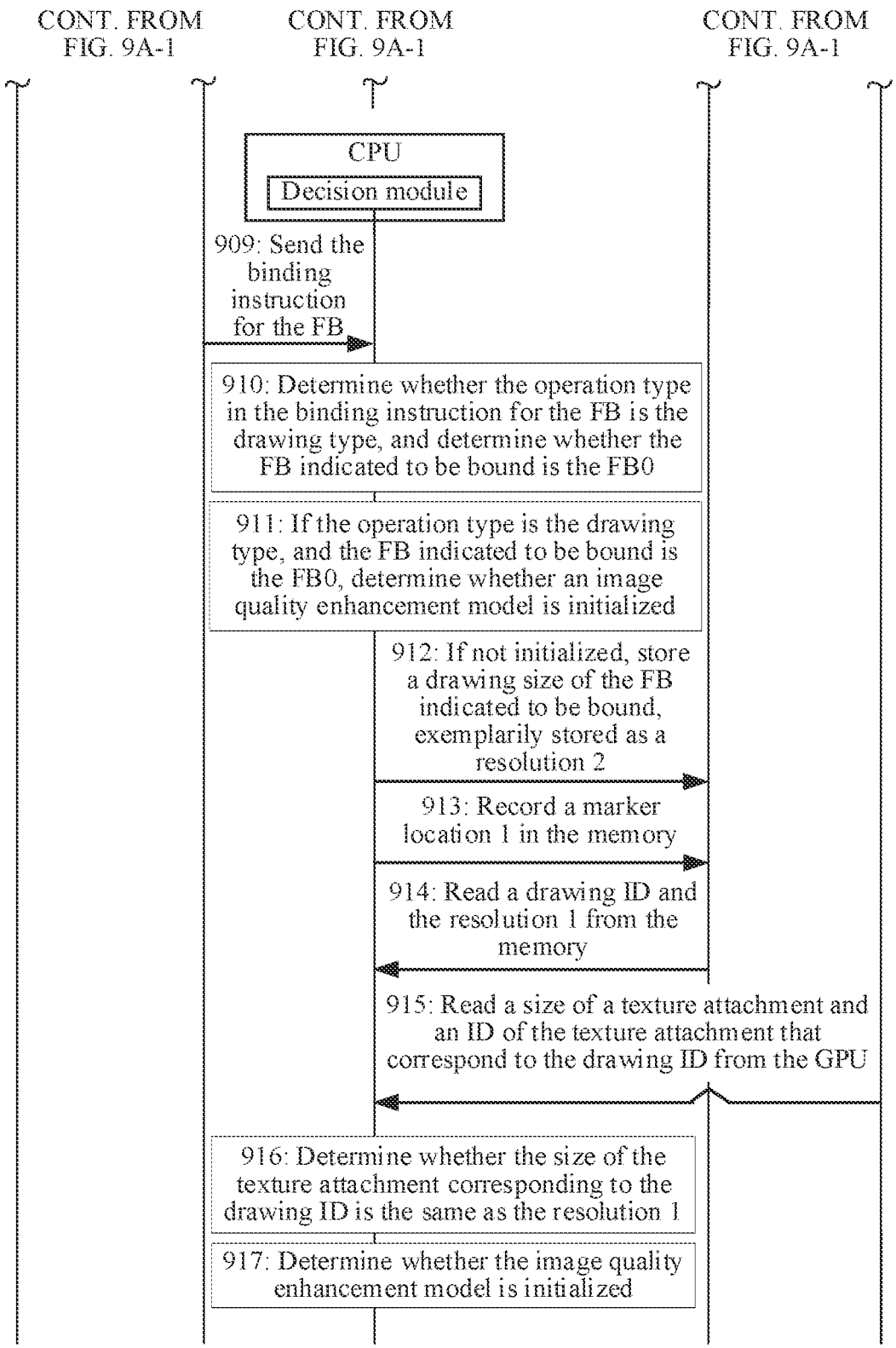
Figures 1, 9B:
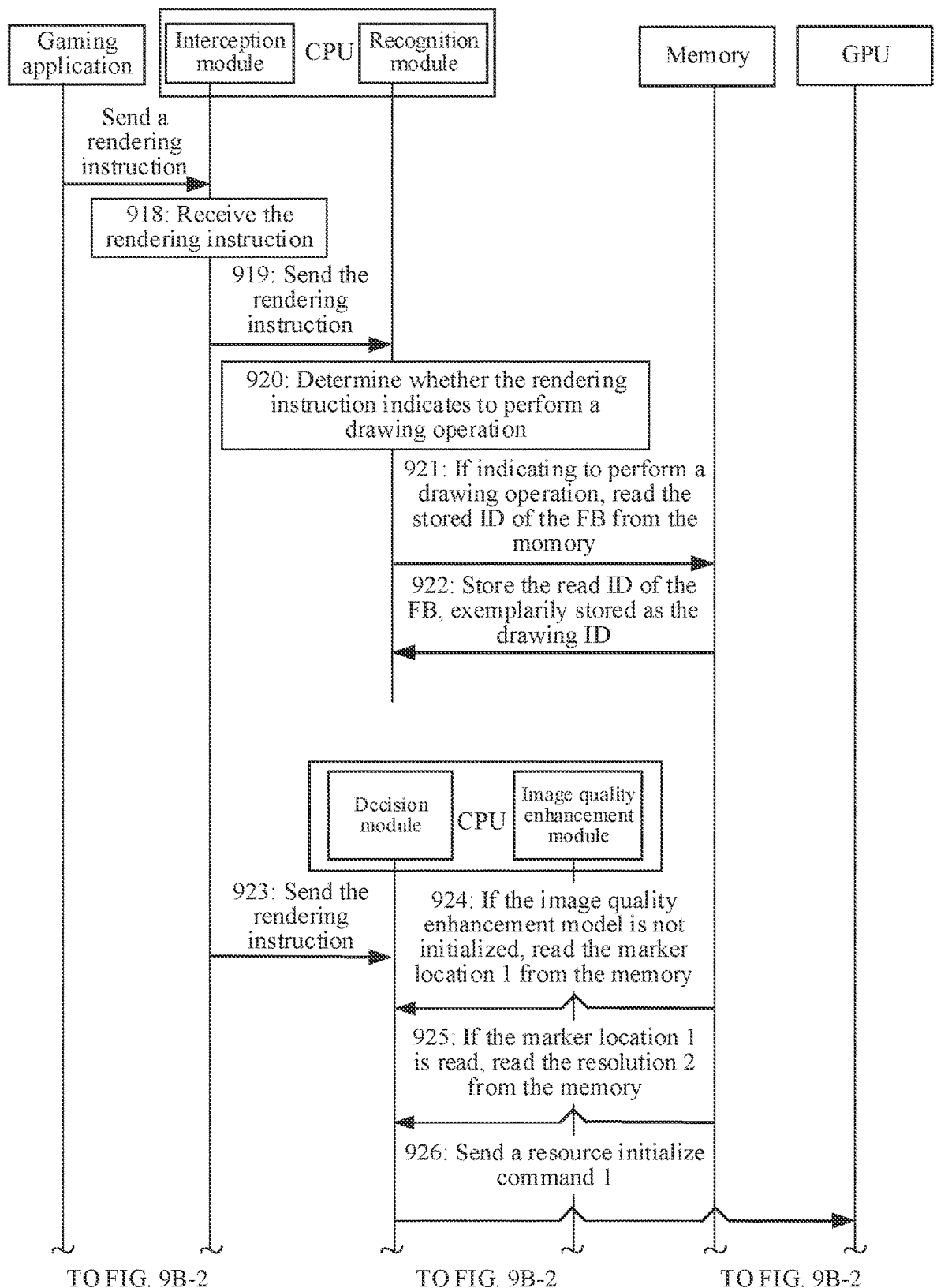
Figures 2, 9B:
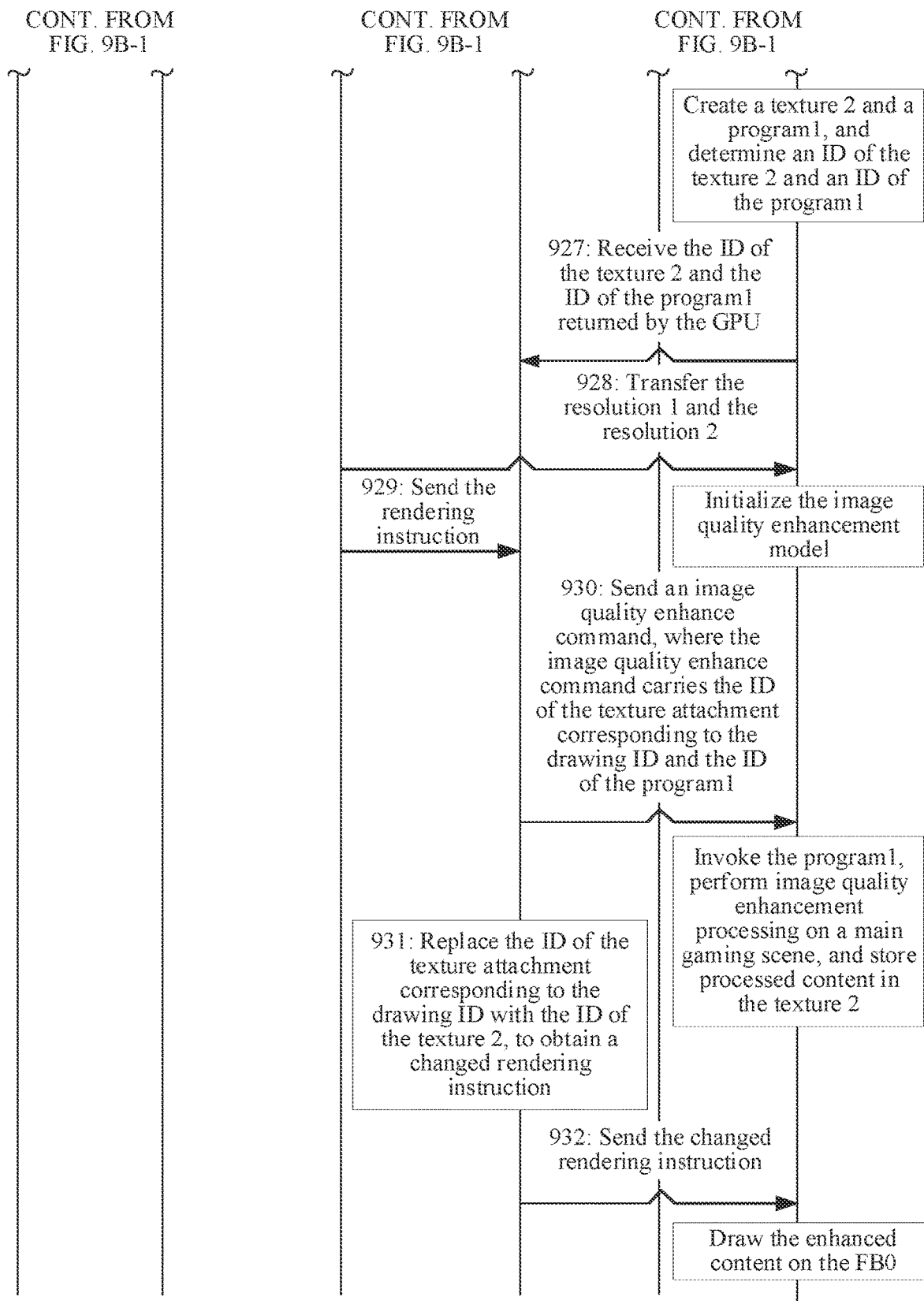
Figure 10:
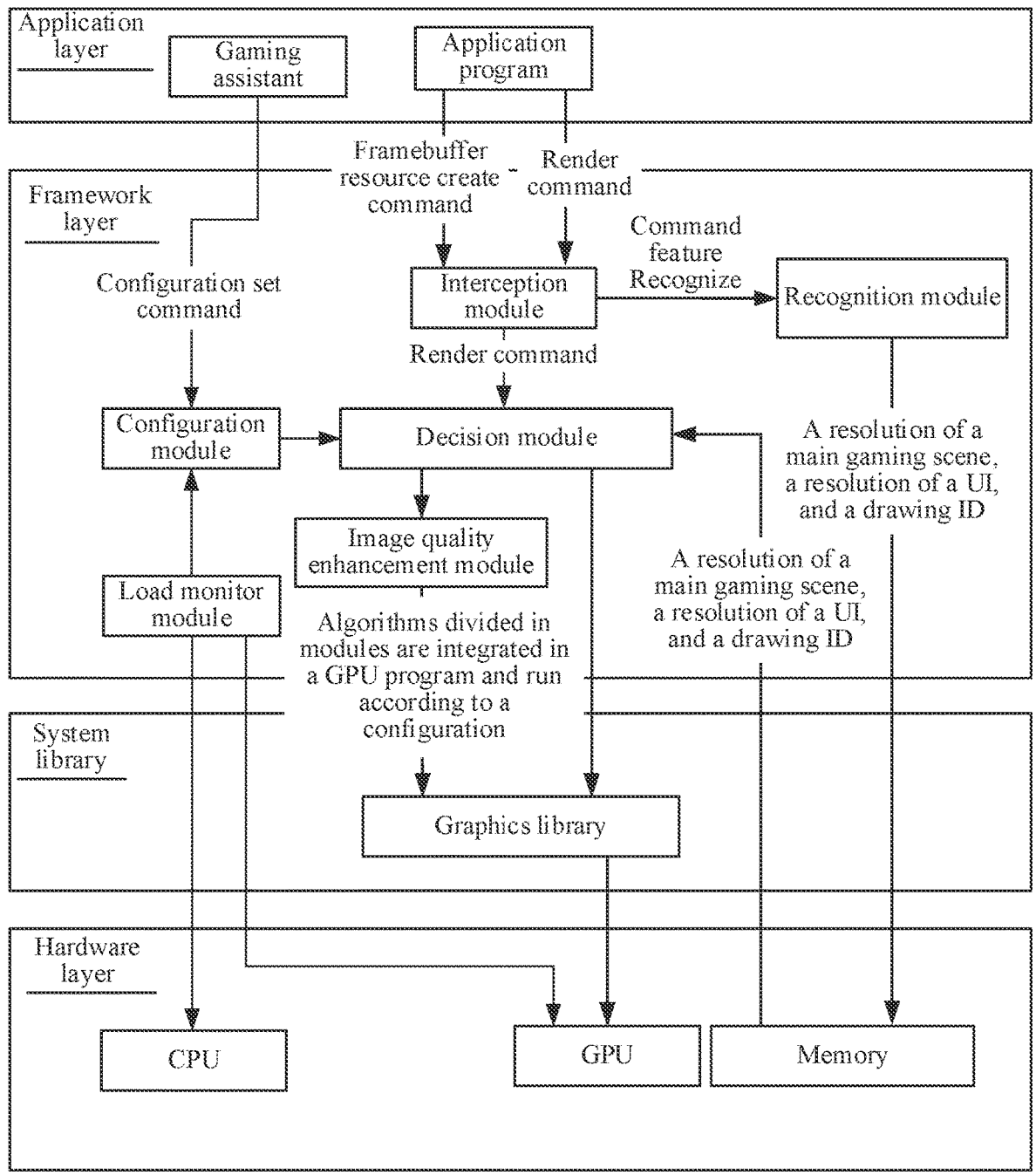
FIG. 10 is a schematic diagram of a principle of another image processing method according to an embodiment of this application.

In the embodiments corresponding to FIG. 8 to FIG. 9B, an example in which the image quality enhancement model is a model fixedly configured with the gaming application is used to describe the image processing scheme according to this application. However, actual implementation is not limited thereto. Refer to FIG. 10. In some other embodiments, the application layer further includes a gaming assistant for receiving a user setting on an enhancement level and/or an enhancement mode of image quality enhancement. The framework layer further includes a load monitor module for collecting a load parameter such as a temperature, a load of the GPU, or a load of the CPU of the electronic device according to the user setting. The configuration module may choose the image quality enhancement model according to the load parameter collected by the load monitor module.

An embodiment of this application further provides an electronic device, including a memory and one or more processors (for example, a CPU, a GPU, and a NPU). The memory is coupled to the processor. The memory is configured to store computer program code, where the computer program code includes computer instructions. When the processor executes the computer instructions, the electronic device may perform the functions or steps performed by the devices in the foregoing method embodiments.

Figure 11:
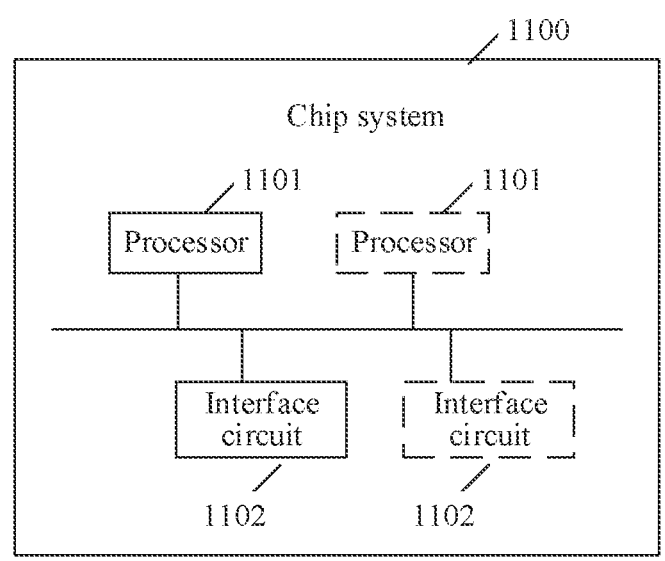
FIG. 11 is a schematic diagram of components of a chip system according to an embodiment of this application.

An embodiment of this application further provides a chip system. As shown in FIG. 11, the chip system 1100 includes at least one processor 1101 and at least one interface circuit 1102. The processor 1101 may be interconnected to the interface circuit 1102 by using a line. For example, the interface circuit 1102 may be configured to receive a signal from another apparatus (such as a memory of an electronic device). In another example, the interface circuit 1102 may be configured to send a signal to another apparatus (for example, the processor 1101). For example, the interface circuit 1102 may read instructions stored in the memory and send the instructions to the processor 1101. When the instructions are executed by the processor 1101, the electronic device may be enabled to perform the steps in the foregoing embodiments. Certainly, the chip system may further include other discrete devices. This is not specifically limited in this embodiment of this application.

An embodiment of this application further provides a computer storage medium. The computer storage medium stores computer instructions. When the computer instructions are run on an electronic device, the electronic device is enabled to perform the foregoing related method steps to implement the image processing method in the foregoing embodiments.

An embodiment of this application further provides a computer program product. When the computer program product runs on a computer, the computer is enabled to perform the foregoing related steps to implement the image processing method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to cause the chip to perform the image processing method in the foregoing method embodiments.

The electronic device, the computer storage medium, the computer program product, or the chip provided in the embodiments may be configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may be one or more physical units, may be located in one place, or may be distributed in multiple different places. Some or all of the units may be selected according to actual needs to achieve the objectives of the solutions of the embodiments.

In addition, function units in the embodiments of this application may be integrated into one processing unit, or each of the units may exist alone physically, or two or more units may be integrated into one unit. The integrated unit may be implemented in the form of hardware, or may be implemented in the form of a software functional unit.

If the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

It should be finally noted that, the foregoing embodiments are only intended for describing the technical solutions of this application but not for limiting this application. Although this application is described in detail with reference to the preferred embodiments, a person of ordinary skill in the art should understand that modifications or equivalent replacements can be made to the technical solutions of this application without departing from the spirit and scope of the technical solutions of this application.

What is claimed is:

1. An image processing method, the method comprising:
    receiving, by an electronic device, a first binding instruction delivered by an application program running on the electronic device, wherein an operation type in the first binding instruction is not a read-only type, and a first framebuffer identifier in the first binding instruction indicates a first framebuffer used for on-screen rendering;
    receiving, by the electronic device, a first rendering instruction delivered by the application program, wherein the first rendering instruction indicates to draw first image content; and
    executing, by the electronic device, a second rendering instruction to draw second image content on the first framebuffer, wherein the second rendering instruction indicates to draw the second image content, the second image content is generated based on the first image content, and a resolution of the second image content is higher than a resolution of the first image content;
    wherein the first image content is obtained through rendering in a second framebuffer, the second framebuffer is used for off-screen rendering, a first texture is bound to the second framebuffer, and a size of the first texture satisfies a preset condition;
    wherein the size of the first texture comprises a width of the first texture and a height of the first texture; and
    wherein:
        the size of the first texture satisfies the preset condition based on the width of the first texture being greater than a first preset value and the height of the first texture being greater than the first preset value; and/or
        the size of the first texture satisfies the preset condition based on a difference between a ratio of the width of the first texture to the height of the first texture and a ratio of a width of a display screen of the electronic device to a height of the display screen being within a preset range.

2. The method according to claim 1,
    wherein the first image content is stored in the first texture, the second image content is stored in a second texture, the first rendering instruction comprises a first texture identifier, and the first texture identifier indicates the first texture; and
    wherein before the executing the second rendering instruction, the method further comprises:
        changing the first texture identifier in the first rendering instruction to a second texture identifier to obtain the second rendering instruction, wherein the second texture identifier indicates the second texture.

3. The method according to claim 2,
    wherein the first rendering instruction further comprises a first program identifier, the first program identifier indicates a first program, the first program is used for drawing an image according to a first shader bound to the first program, a first model is not integrated in the first shader, and the first model is used for image sharpening processing and/or noise reduction processing;
    wherein the obtaining the second rendering instruction further comprises:
        changing the first program identifier in the first rendering instruction to a second program identifier to obtain the second rendering instruction, wherein the second rendering identifier indicates a second program, the second program is used for drawing an image according to a second shader bound to the second program, and the first model is integrated in the second shader; and
    wherein the executing the second rendering instruction to draw the second image content on the first framebuffer comprises:
        executing the second rendering instruction to draw, on the first framebuffer, the second image content on which the sharpening processing is performed, and/or, to draw, on the first framebuffer, the second image content on which the noise reduction processing is performed.

4. The method according to claim 3, wherein before the receiving the first binding instruction delivered by the application program, the method further comprises:
    receiving a first create command delivered by the application program, wherein the first create command is used for creating a third framebuffer, the first create command comprises a size of a third texture bound to the third framebuffer, and the size of the third texture satisfies the preset condition; and storing the size of the third texture, wherein the size of the first texture satisfies the preset condition based on the size of the first texture being equal to the size of the third texture.

5. The method according to claim 4, wherein before the receiving the first binding instruction delivered by the application program, the method further comprises:
receiving a second binding instruction delivered by the application program, wherein the operation type in the second binding instruction is not the read-only type, and a second framebuffer identifier in the second binding instruction does not indicate the first framebuffer; and
storing the second framebuffer identifier.

6. The method according to claim 5, wherein after the receiving the second binding instruction delivered by the application program, the method further comprises:
receiving a third rendering instruction delivered by the application program, wherein a rendering operation indicated to be performed in the third rendering instruction comprises a drawing operation;
wherein the storing the second framebuffer identifier comprises:
storing the second framebuffer identifier in response to receiving the third rendering instruction.

7. The method according to claim 6, wherein after the storing the second framebuffer identifier, the method further comprises:
receiving a third binding instruction delivered by the application program, wherein the operation type in the third binding instruction is not the read-only type, and a third framebuffer identifier in the third binding instruction does not indicate the first framebuffer; and
replacing the stored second framebuffer identifier with the third framebuffer identifier.

8. The method according to claim 7, wherein after the receiving the first binding instruction delivered by the application program, the method further comprises:
determining whether a size of a to-be-processed texture bound to a to-be-processed framebuffer satisfies the preset condition, wherein the to-be-processed framebuffer is a framebuffer indicated by a stored framebuffer identifier;
wherein the executing the second rendering instruction comprises:
executing the second rendering instruction based on the size of the to-be-processed texture satisfying the preset condition; and
wherein the second framebuffer is the to-be-processed framebuffer, the first image content is obtained through rendering in the to-be-processed framebuffer, and the first texture is the to-be-processed texture.

9. The method according to claim 8, wherein before the executing the second rendering instruction, the method further comprises:
processing the first image content to generate the second image content.

10. The method according to claim 9, wherein the processing the first image content comprises:
invoking a third program to process the first image content, wherein the third program is used for drawing an image according to a third shader bound to the third program, algorithmic source code of a second model is integrated in the third shader, and the second model is used for improving a resolution of the image.

11. The method according to claim 10, wherein the first binding instruction comprises a drawing size, and after the receiving the first binding instruction delivered by the application program, the method further comprises:
obtaining a first marker, wherein the first marker indicates that initialization of a model is completed, and the model comprises the second model; and
storing the drawing size based on the first marker is not being obtained, and skipping storing the drawing size based on the first marker being obtained.

12. The method according to claim 11, wherein before the invoking the third program to process the first image content, the method further comprises:
initializing the second model in the third program according to the size of the third texture and the drawing size;
wherein the invoking a third program to process the first image content comprises:
invoking, after the second model is initialized in the third program, the third program to process the first image content.

13. The method according to claim 12, wherein after the initializing the second model in the third program, the method further comprises:
storing the first marker.

14. The method according to claim 13,
wherein after the receiving the first binding instruction delivered by the application program, the method further comprises:
storing a second marker, wherein the second marker indicates that the first framebuffer is currently bound;
wherein after the receiving the first rendering instruction delivered by the application program, the method further comprises:
obtaining the second marker; and
wherein the executing the second rendering instruction comprises:
executing the second rendering instruction based on the second marker being obtained.

15. The method according to claim 14, wherein after the storing the second marker, the method further comprises:
deleting the second marker after receiving a fourth binding instruction delivered by the application program, wherein a fourth framebuffer identifier in the fourth binding instruction does not indicate the first framebuffer.

16. The method according to claim 15,
wherein there are a plurality of second models, the plurality of second models are integrated in a plurality of third shaders in one-to-one correspondence, and the plurality of shaders are one-to-one bound to a plurality of third programs;
wherein before the invoking the third program to process the first image content, the method further comprises:
selecting a target model according to an enhancement level and/or an enhancement mode, wherein the target model is one of the plurality of second models; and
wherein the invoking the third program to process the first image content comprises:
invoking the third program in which the target model is located to process the first image content.

17. An electronic device, comprising:
one or more processors; and
a memory, wherein the memory is coupled to the processor, the memory stores computer program code, the computer program code comprises computer instructions, and when the computer instructions are executed by the one or more processors, the electronic device is enabled to perform operations comprising:

receiving a first binding instruction delivered by an application program running on the electronic device, wherein an operation type in the first binding instruction is not a read-only type, and a first framebuffer identifier in the first binding instruction indicates a first framebuffer used for on-screen rendering;

receiving a first rendering instruction delivered by the application program, wherein the first rendering instruction indicates to draw first image content; and executing a second rendering instruction to draw second image content on the first framebuffer, wherein the second rendering instruction indicates to draw the second image content, the second image content is generated based on the first image content, and a resolution of the second image content is higher than a resolution of the first image content;

wherein the first image content is obtained through rendering in a second framebuffer, the second framebuffer is used for off-screen rendering, a first texture is bound to the second framebuffer, and a size of the first texture satisfies a preset condition;

wherein the size of the first texture comprises a width of the first texture and a height of the first texture; and wherein:

the size of the first texture satisfies the preset condition based on the width of the first texture being greater than a first preset value and the height of the first texture being greater than the first preset value; and/or the size of the first texture satisfies the preset condition based on a difference between a ratio of the width of the first texture to the height of the first texture and a ratio of a width of a display screen of the electronic device to a height of the display screen being within a preset range.

18. The electronic device according to claim 17, wherein the first image content is stored in the first texture, the second image content is stored in a second texture, the first rendering instruction comprises a first texture identifier, and the first texture identifier indicates the first texture; and wherein before the executing the second rendering instruction, the operations further comprise:

changing the first texture identifier in the first rendering instruction to a second texture identifier to obtain the second rendering instruction, wherein the second texture identifier indicates the second texture.

19. A non-transitory computer-readable storage medium storing computer instructions, wherein when the computer instructions are run on an electronic device, the electronic device is enabled to perform operations comprising:

receiving a first binding instruction delivered by an application program running on the electronic device, wherein an operation type in the first binding instruction is not a read-only type, and a first framebuffer identifier in the first binding instruction indicates a first framebuffer used for on-screen rendering;

receiving a first rendering instruction delivered by the application program, wherein the first rendering instruction indicates to draw first image content; and executing a second rendering instruction to draw second image content on the first framebuffer, wherein the second rendering instruction indicates to draw the second image content, the second image content is generated based on the first image content, and a resolution of the second image content is higher than a resolution of the first image content;

wherein the first image content is obtained through rendering in a second framebuffer, the second framebuffer is used for off-screen rendering, a first texture is bound to the second framebuffer, and a size of the first texture satisfies a preset condition;

wherein the size of the first texture comprises a width of the first texture and a height of the first texture; and wherein:

the size of the first texture satisfies the preset condition based on the width of the first texture being greater than a first preset value and the height of the first texture being greater than the first preset value; and/or the size of the first texture satisfies the preset condition based on a difference between a ratio of the width of the first texture to the height of the first texture and a ratio of a width of a display screen of the electronic device to a height of the display screen being within a preset range.

20. The non-transitory computer-readable storage medium according to claim 19, wherein the first image content is stored in the first texture, the second image content is stored in a second texture, the first rendering instruction comprises a first texture identifier, and the first texture identifier indicates the first texture; and wherein before the executing the second rendering instruction, the operations further comprise:

changing the first texture identifier in the first rendering instruction to a second texture identifier to obtain the second rendering instruction, wherein the second texture identifier indicates the second texture.

\* \* \* \* \*